US012701126B2

(12) United States Patent
Hu et al.

(10) Patent No.: US 12,701,126 B2
(45) Date of Patent: Aug. 4, 2026

(54) VISUAL DEEP LEARNING FOR INLINE PHISHING DETECTION

(71) Applicant: Palo Alto Networks, Inc., Santa Clara, CA (US)

(72) Inventors: Lucas Hu, San Francisco, CA (US); Yu Zhang, Newark, CA (US); Jingwei Fan, Chapel Hill, NC (US); Wei Wang, Milpitas, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 56 days.

(21) Appl. No.: 18/651,537

(22) Filed: Apr. 30, 2024

(65) Prior Publication Data

US 2025/0337758 A1 Oct. 30, 2025

(51) Int. Cl.
H04L 9/00 (2022.01)
G06V 30/19 (2022.01)
H04L 9/40 (2022.01)

(52) U.S. Cl.
CPC .......... H04L 63/1416 (2013.01); G06V 30/19 (2022.01); H04L 63/1483 (2013.01)

(58) Field of Classification Search
CPC . H04L 63/1416; H04L 63/1483; G06V 30/19; G06F 21/56; G06F 2221/2119; G06N 3/08
See application file for complete search history.

(56) References Cited

U.S. PATENT DOCUMENTS

| | | | |
|---|---|---|---|
| 10,999,322 B1 | 5/2021 | Yuan | |
| 12,217,480 B1 * | 2/2025 | Karpman | G06V 10/761 |
| 12,413,620 B1 * | 9/2025 | Dambra | H04L 63/1433 |
| 2019/0014149 A1 | 1/2019 | Cleveland | |
| 2020/0134377 A1 * | 4/2020 | Attorre | G06V 10/82 |
| 2020/0358819 A1 * | 11/2020 | Bowditch | G06F 17/18 |
| 2021/0344711 A1 * | 11/2021 | Cleveland | H04L 63/1483 |
| 2022/0377110 A1 | 11/2022 | Shashi | |
| 2024/0211496 A1 * | 6/2024 | Polaczuk | G06N 3/045 |
| 2024/0265114 A1 | 8/2024 | Lambotte | |

FOREIGN PATENT DOCUMENTS

| | | |
|---|---|---|
| CN | 114448664 | 1/2024 |
| CN | 117935292 | 5/2024 |

OTHER PUBLICATIONS

Github—lindsey98, PhishIntention: Phishing Detection Through Webpage Intention, 2022.
(Continued)

*Primary Examiner* — Syed M Ahsan
(74) *Attorney, Agent, or Firm* — Van Pelt, Yi & James LLP

(57) ABSTRACT

Techniques for visual deep learning for inline phishing detection are disclosed. In some embodiments, a system/process/computer program product for visual deep learning for inline phishing detection includes extracting a logo from a screenshot of a web page; detecting phishing based on a match to at least one of a plurality of reference logos using a visual deep learning model and that a domain associated with the web page is not associated with an entity that matches the logo extracted from the web page; and performing a remedial action in response to determining that the web page is associated with phishing.

20 Claims, 16 Drawing Sheets

1102 ⌐

Extract a logo from a screenshot of a web page.

1104 ⌐

Detect phishing based on a match to at least one of a plurality of reference logos using a visual deep learning model and that a domain associated with the web page is not associated with an entity that matches the logo extracted from the web page.

1106 ⌐

Perform a remedial action in response to determining that the web page is associated with phishing.

(56)                References Cited

OTHER PUBLICATIONS

Github, OpenGVLab/Siamese-Image-Modeling: [CVPR 2023], Implementation of Siamese Image Modeling for Self-Supervised Vision Representation Learning, pp. 1-4.
Hu et al., Meddler-in-the-Middle Phishing Attacks Explained, Dec. 21, 2022, pp. 1-15.
Kondracki et al., Catching Transparent Phish: Analyzing and Detecting MITM Phishing Toolkits, CCS '21, Nov. 15-19, 2021, pp. 1-15.
Liu et al., Inferring Phishing Intention via Webpage Appearance and Dynamics: A Deep Vision Based Approach, Proceedings of the 31st Usenix Security Symposium, Aug. 10-12, 2022, pp. 1633-1650.
Walkowiak et al., Evaluation of Vector Embedding Models in Clustering of Text Documents, Proceedings of Recent Advances in Natural Language Processing, pp. 1304-1311.

* cited by examiner

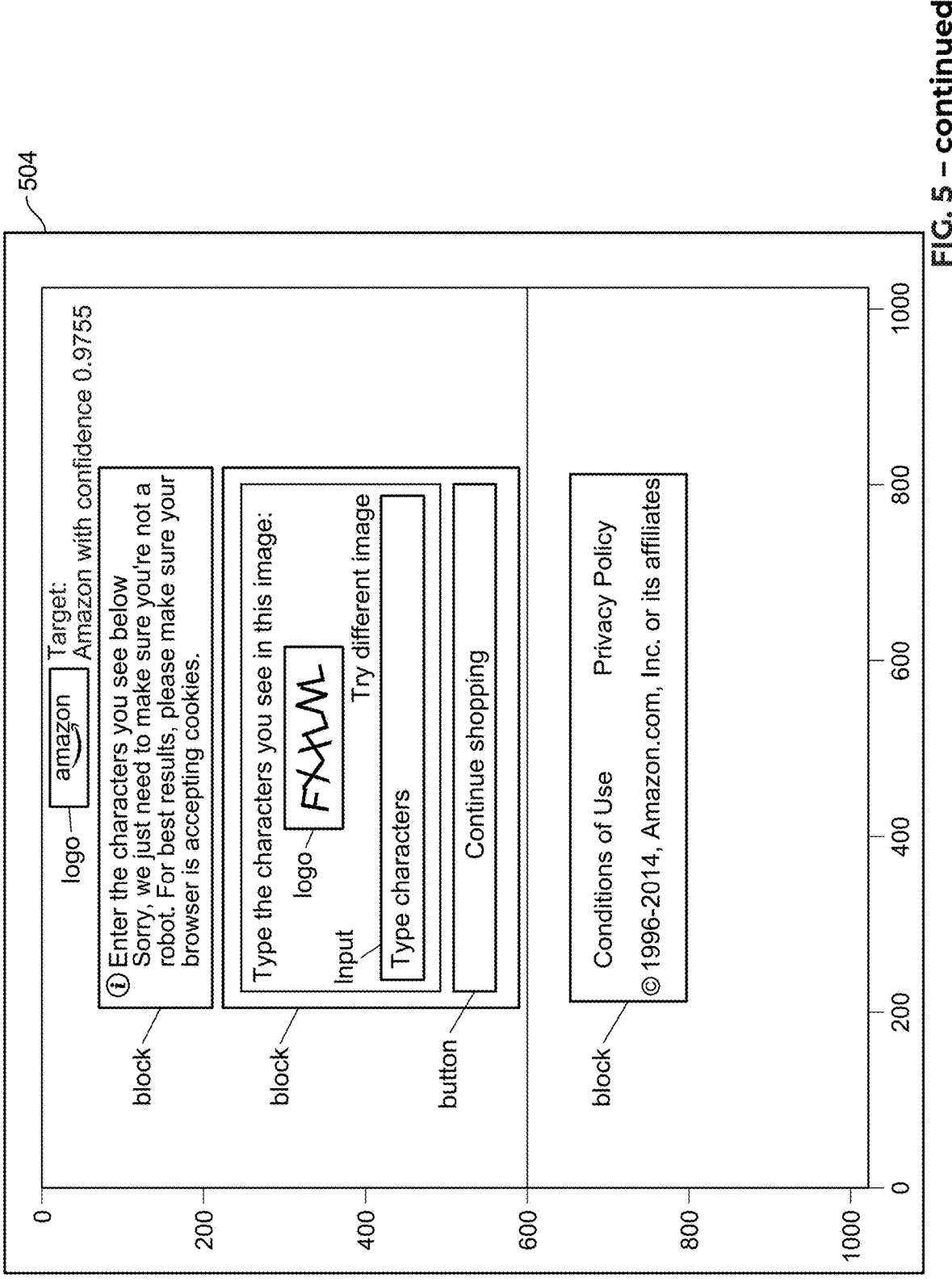
FIG. 5 – continued-

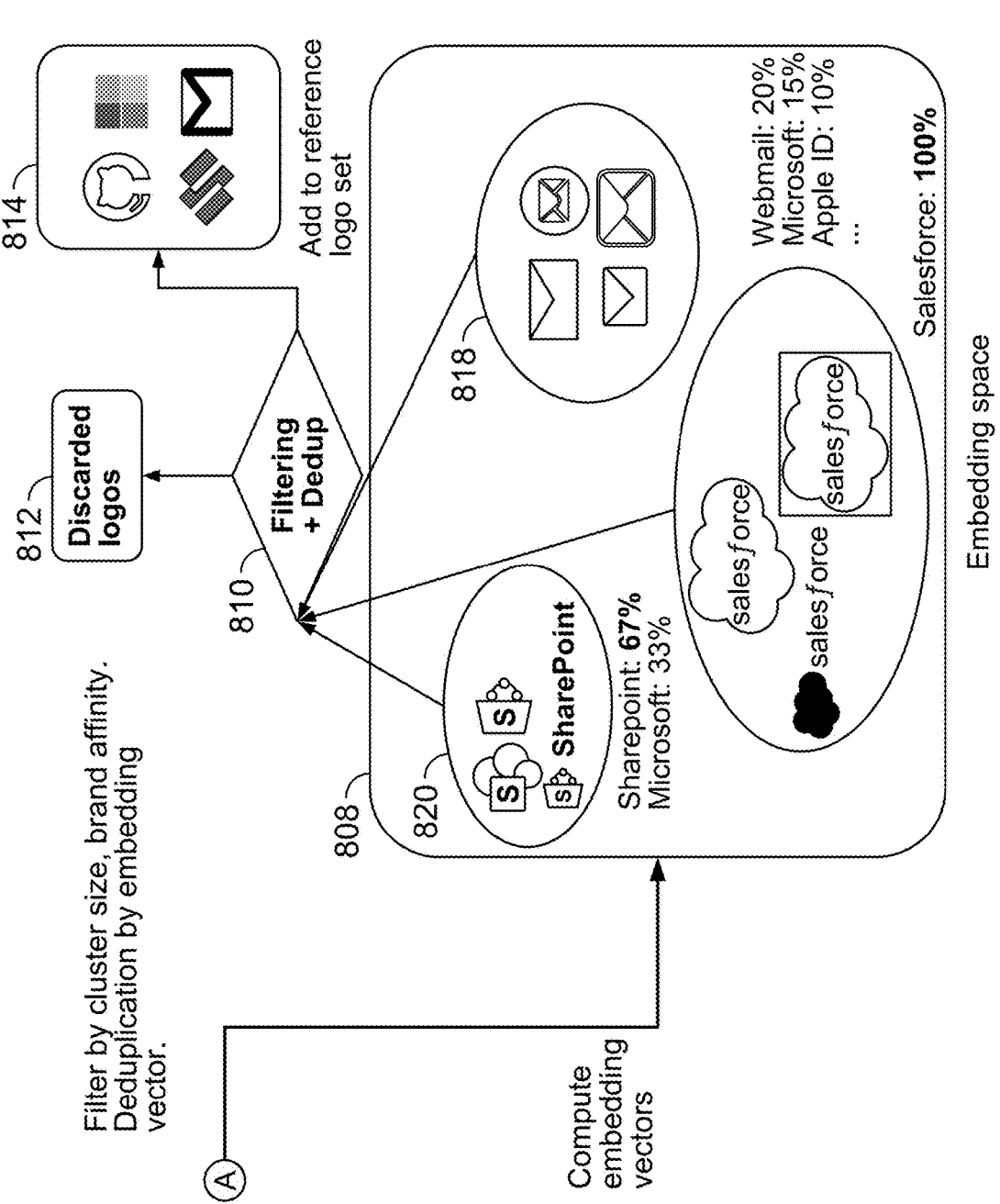
FIG. 8 – continued-

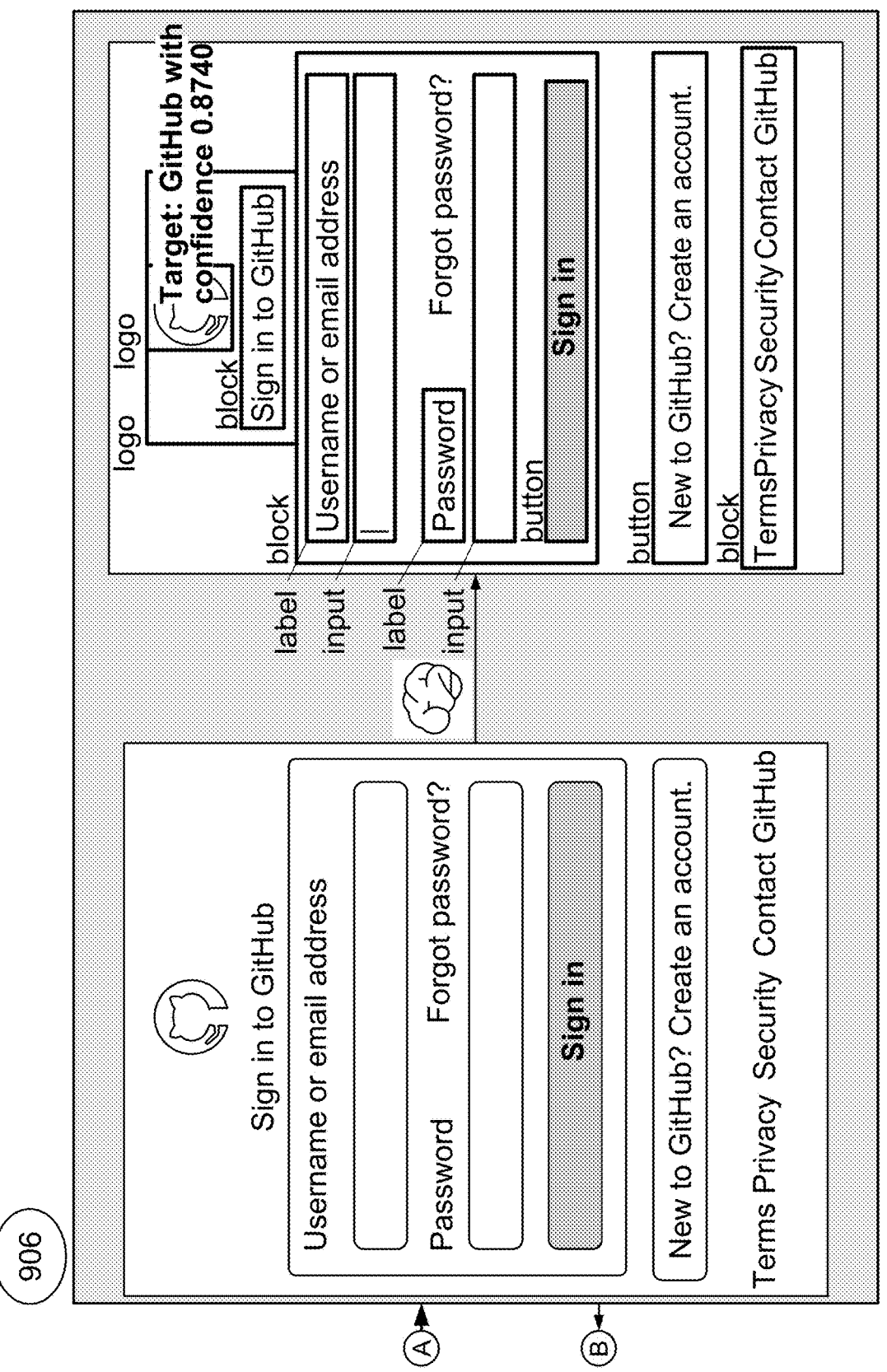
FIG. 9 – continued-

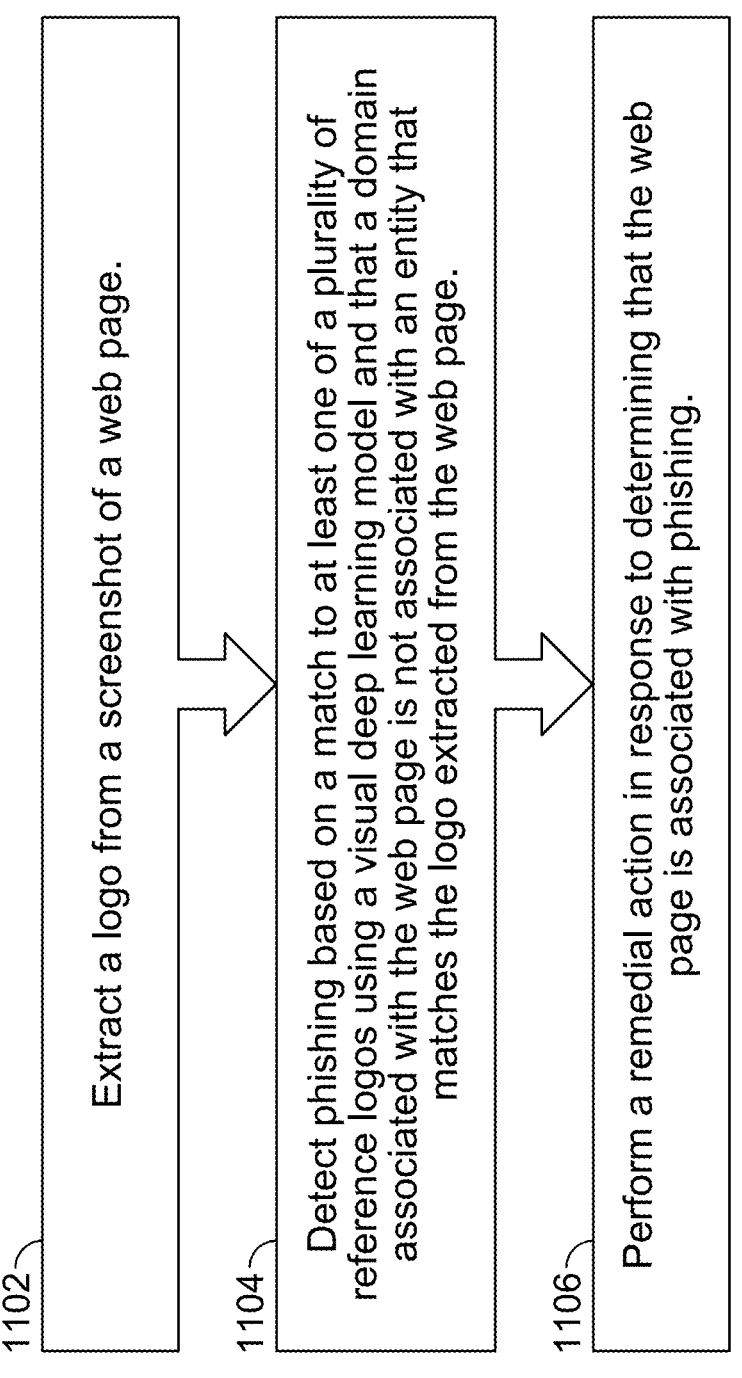

1102 Extract a logo from a screenshot of a web page.

1104 Detect phishing based on a match to at least one of a plurality of reference logos using a visual deep learning model and that a domain associated with the web page is not associated with an entity that matches the logo extracted from the web page.

1106 Perform a remedial action in response to determining that the web page is associated with phishing.

FIG. 11

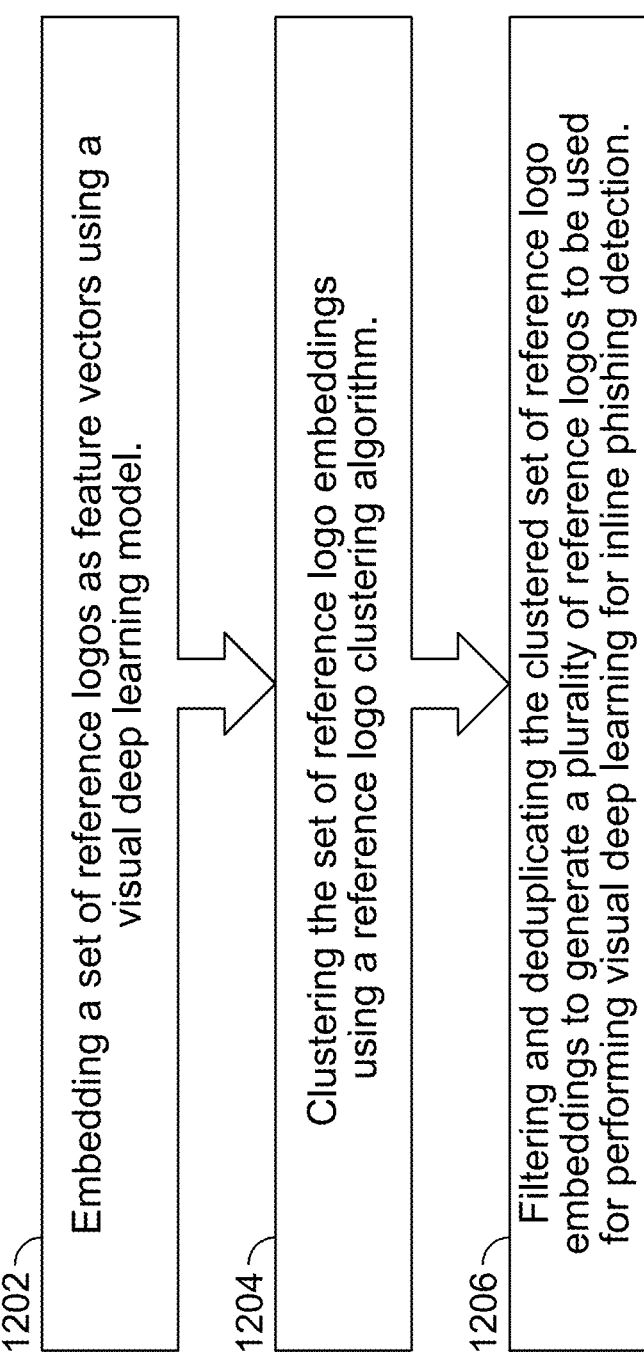

1202 Embedding a set of reference logos as feature vectors using a visual deep learning model.

1204 Clustering the set of reference logo embeddings using a reference logo clustering algorithm.

1206 Filtering and deduplicating the clustered set of reference logo embeddings to generate a plurality of reference logos to be used for performing visual deep learning for inline phishing detection.

FIG. 12

VISUAL DEEP LEARNING FOR INLINE PHISHING DETECTION

BACKGROUND OF THE INVENTION

Malware is a general term commonly used to refer to malicious software (e.g., including a variety of hostile, intrusive, and/or otherwise unwanted software). Malware can be in the form of code, scripts, active content, and/or other software. Example uses of malware include disrupting computer and/or network operations, stealing proprietary information (e.g., confidential information, such as identity, financial, and/or intellectual property related information), and/or gaining access to private/proprietary computer systems and/or computer networks. Unfortunately, as techniques are developed to help detect and mitigate malware, nefarious authors find ways to circumvent such efforts. Accordingly, there is an ongoing need for improvements to techniques for identifying and mitigating malware.

BRIEF DESCRIPTION OF THE DRA WINGS

Various embodiments of the invention are disclosed in the following detailed description and the accompanying drawings.

FIG. 11 illustrates a process for providing visual deep learning for inline phishing detection in accordance with some embodiments.

FIG. 12 illustrates another process for providing visual deep learning for inline phishing detection in accordance with some embodiments.

DETAILED DESCRIPTION

Figure 1:
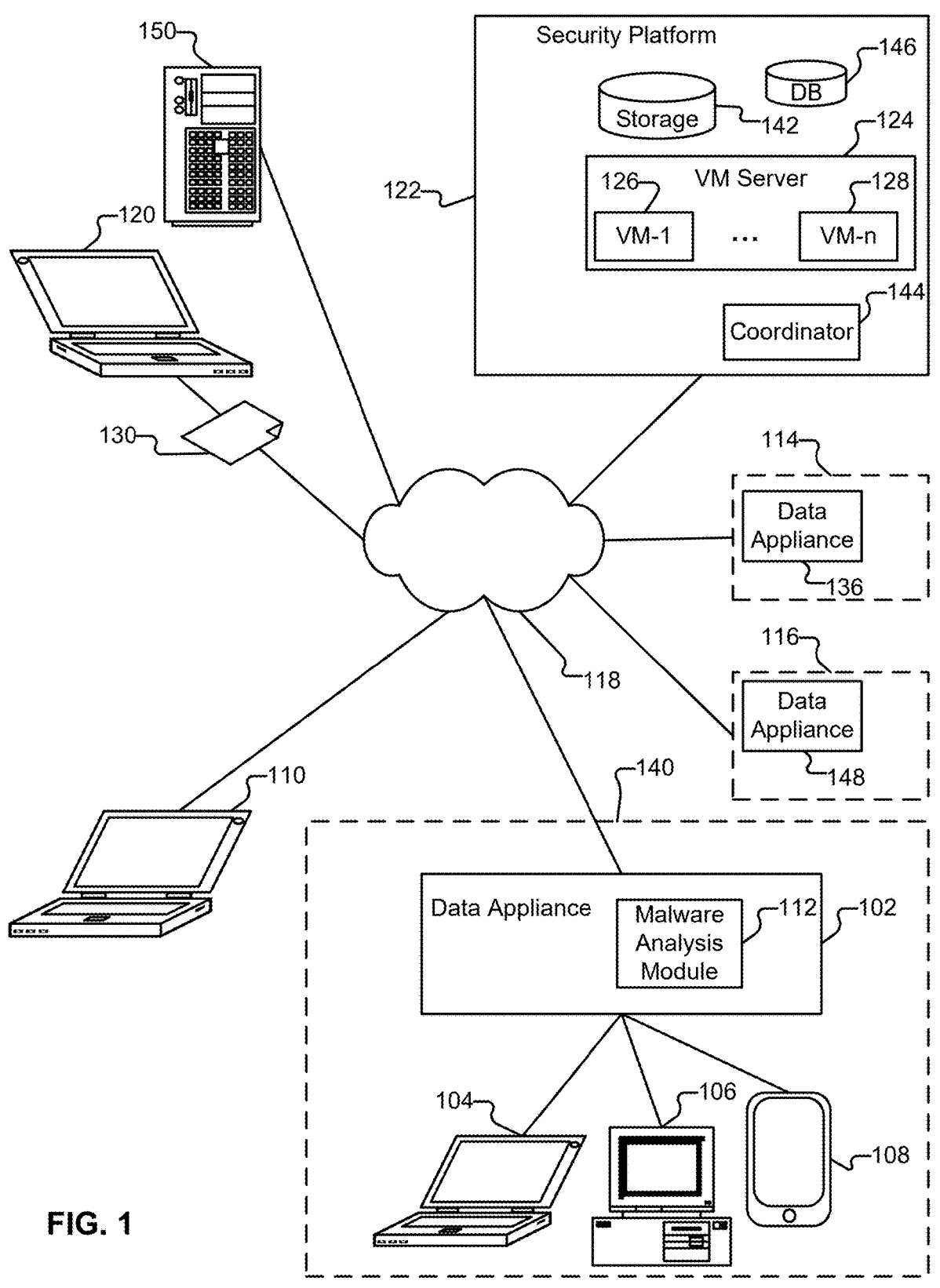
FIG. 1 illustrates an example of an environment in which malicious applications ("malware") are detected and prevented from causing harm.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A firewall generally protects networks from unauthorized access while permitting authorized communications to pass through the firewall. A firewall is typically a device, a set of devices, or software executed on a device that provides a firewall function for network access. For example, a firewall can be integrated into operating systems of devices (e.g., computers, smart phones, or other types of network communication capable devices). A firewall can also be integrated into or executed as one or more software applications on various types of devices, such as computer servers, gateways, network/routing devices (e.g., network routers), and data appliances (e.g., security appliances or other types of special purpose devices), and in various implementations, certain operations can be implemented in special purpose hardware, such as an ASIC or FPGA.

Firewalls typically deny or permit network transmission based on a set of rules. These sets of rules are often referred to as policies (e.g., network policies or network security policies). For example, a firewall can filter inbound traffic by applying a set of rules or policies to prevent unwanted outside traffic from reaching protected devices. A firewall can also filter outbound traffic by applying a set of rules or policies (e.g., allow, block, monitor, notify or log, and/or other actions can be specified in firewall rules or firewall policies, which can be triggered based on various criteria, such as are described herein). A firewall can also filter local network (e.g., intranet) traffic by similarly applying a set of rules or policies.

Security devices (e.g., security appliances, security gateways, security services, and/or other security devices) can include various security functions (e.g., firewall, anti-malware, intrusion prevention/detection, Data Loss Prevention (DLP), and/or other security functions), networking functions (e.g., routing, Quality of Service (QOS), workload balancing of network related resources, and/or other networking functions), and/or other functions. For example, routing functions can be based on source information (e.g., IP address and port), destination information (e.g., IP address and port), and protocol information.

A basic packet filtering firewall filters network communication traffic by inspecting individual packets transmitted over a network (e.g., packet filtering firewalls or first generation firewalls, which are stateless packet filtering firewalls). Stateless packet filtering firewalls typically inspect the individual packets themselves and apply rules based on the inspected packets (e.g., using a combination of a packet's source and destination address information, protocol information, and a port number).

Application firewalls can also perform application layer filtering (e.g., application layer filtering firewalls or second generation firewalls, which work on the application level of the TCP/IP stack). Application layer filtering firewalls or application firewalls can generally identify certain applications and protocols (e.g., web browsing using HyperText Transfer Protocol (HTTP), a Domain Name System (DNS) request, a file transfer using File Transfer Protocol (FTP), and various other types of applications and other protocols, such as Telnet, DHCP, TCP, UDP, and TFTP (GSS)). For example, application firewalls can block unauthorized protocols that attempt to communicate over a standard port (e.g., an unauthorized/out of policy protocol attempting to sneak through by using a non-standard port for that protocol can generally be identified using application firewalls).

Stateful firewalls can also perform state-based packet inspection in which each packet is examined within the context of a series of packets associated with that network transmission's flow of packets. This firewall technique is generally referred to as a stateful packet inspection as it maintains records of all connections passing through the firewall and is able to determine whether a packet is the start of a new connection, a part of an existing connection, or is an invalid packet. For example, the state of a connection can itself be one of the criteria that triggers a rule within a policy.

Advanced or next generation firewalls can perform stateless and stateful packet filtering and application layer filtering as discussed above. Next generation firewalls can also perform additional firewall techniques. For example, certain newer firewalls sometimes referred to as advanced or next generation firewalls can also identify users and content (e.g., next generation firewalls). In particular, certain next generation firewalls are expanding the list of applications that these firewalls can automatically identify to thousands of applications. Examples of such next generation firewalls are commercially available from Palo Alto Networks, Inc. (e.g., Palo Alto Networks' PA Series firewalls). For example, Palo Alto Networks' next generation firewalls enable enterprises to identify and control applications, users, and content—not just ports, IP addresses, and packets—using various identification technologies, such as the following: APP-ID for accurate application identification, User-ID for user identification (e.g., by user or user group), and Content-ID for real-time content scanning (e.g., controlling web surfing and limiting data and file transfers). These identification technologies allow enterprises to securely enable application usage using business-relevant concepts, instead of following the traditional approach offered by traditional port-blocking firewalls. Also, special purpose hardware for next generation firewalls (implemented, for example, as dedicated appliances) generally provide higher performance levels for application inspection than software executed on general purpose hardware (e.g., such as security appliances provided by Palo Alto Networks, Inc., which use dedicated, function specific processing that is tightly integrated with a single-pass software engine to maximize network throughput while minimizing latency).

Advanced or next generation firewalls can also be implemented using virtualized firewalls. Examples of such next generation firewalls are commercially available from Palo Alto Networks, Inc. (e.g., Palo Alto Networks' VM Series firewalls, which support various commercial virtualized environments, including, for example, VMware® ESXi™ and NSX™, Citrix® Netscaler SDX™, KVM/OpenStack (Centos/RHEL, Ubuntu®), and Amazon Web Services (AWS)) as well as CN Series container next generation firewalls. For example, virtualized firewalls can support similar or the exact same next-generation firewall and advanced threat prevention features available in physical form factor appliances, allowing enterprises to safely enable applications flowing into, and across their private, public, and hybrid cloud computing environments. Automation features such as VM monitoring, dynamic address groups, and a REST-based API allow enterprises to proactively monitor VM changes dynamically feeding that context into security policies, thereby eliminating the policy lag that may occur when VMs change.

TECHNICAL CHALLENGES WITH DETECTING PHISHING ATTACKS

Internet users are under constant attack from cybercriminals. One type of attack is a phishing attack, where the ultimate goal of the attacker is to steal information from the user, such as a social security account number or banking credentials. Unfortunately, as techniques are developed to identify and prevent existing phishing attacks, new attacks are ever emerging, for which existing protections are insufficient. Therefore, an ongoing need exists to detect and mitigate such attacks.

Common phishing attacks have typically relied on creating HTML templates. However, building spoofed HTML templates requires time and effort for attackers to generate. Most work is spent on attempting to make the spoofed HTML templates appear similar enough to the target web pages to potentially trick users, as well as being responsive on mobile devices and/or properly obfuscated to evade existing phishing detection scanners.

Also, new types of phishing attacks utilize Man-in-the-Middle (MitM) attack servers (e.g., VNC-based MitM phishing attacks, such as further described below with respect to FIG. 4) to attempt to evade detection of existing phishing detection techniques, such as by not sending HTML content (e.g., raw HTML and HTTP headers) from the target website to the victim user's web browser (e.g., also referred to herein as browser). As such, existing phishing detection techniques that attempt to identify a phishing attack based on the HTML content are generally ineffective against such new phishing attacks as there is no suspicious HTML content.

Further, if an attacker were to put a MitM VNC-based attack behind, for example, a Captcha page, or another cloaking mechanism, then existing security providers' offline crawlers would have no way of detecting the phishing page either (e.g., offline detection systems would still have access to the web page screenshot, but the screenshot in this case would just be a Captcha page, so the web page would successfully avoid detection by existing phishing detection approaches).

As such, such a phishing attack would generally be undetected by both existing offline and inline phishing detection approaches.

Thus, new and improved techniques for detecting phishing are needed.

Overview of Techniques for Visual Deep Learning for Inline Phishing Detection

Accordingly, new and improved solutions for visual deep learning for inline phishing detection are disclosed with respect to various embodiments.

For example, what is needed are new and improved solutions for visual deep learning for inline phishing detection that can utilize browser artifacts, such as a rendered web page screenshot, for automated phishing detection (e.g., rather than solely based on HTTP content, such as the raw HTML and/or HTTP headers). Specifically, a new and improved visual analysis based on machine learning techniques is disclosed for effective and efficient inline detection of such new and evolving phishing attacks (e.g., MitM VNC-based phishing attacks).

In some embodiments, a system/process/computer program product for visual deep learning for inline phishing detection includes extracting a logo from a screenshot of a web page; detecting phishing based on a match to at least one of a plurality of reference logos using a visual deep learning model and that a domain associated with the web page is not associated with an entity that matches the logo extracted from the web page; and performing a remedial action in response to determining that the web page is associated with phishing.

In some embodiments, a system/process/computer program product for visual deep learning for inline phishing detection further includes embedding a set of reference logos as feature vectors using a visual deep learning model; clustering the set of reference logo embeddings using a reference logo clustering algorithm; and filtering and deduplicating the clustered set of reference logo embeddings to generate a plurality of reference logos to be used for performing visual deep learning for inline phishing detection.

As such, the disclosed techniques for visual deep learning for inline phishing detection facilitate effective and efficient inline phishing detection.

Also, the disclosed techniques for visual deep learning for inline phishing detection can allow customers of the phishing detection solution/service to prioritize certain phishing attacks encountered in their web traffic depending on the type of brand being targeted (e.g., corporate related logins, such as a corporate email login, may be prioritized over a social media platform, such as an individual user's Facebook login, related logins, etc.).

Further, the disclosed techniques for visual deep learning for inline phishing detection can facilitate phishing brand identification that can be used for explainability (e.g., typically, verdicts from machine learning/deep learning models are not explainable) as well as triage (e.g., prioritization of corporate related login phishing pages, such as a corporate email credentials/login, may be compromised, as similarly discussed above, etc.).

In an example implementation, the disclosed techniques for providing visual deep learning for inline phishing detection can be implemented in a web browser extension (e.g., a Google Chrome browser extension, which can be executed in the Chrome extension or inside the browser, or an extension for another web browser can similarly be used).

For example, the disclosed techniques can be implemented in a web browser extension (e.g., a Google Chrome browser extension), such as will be further described below.

In another example implementation, the disclosed visual deep learning for phishing detection can be applied for inline phishing detection that is implemented as a browser extension, or a plugin, in an enterprise browser (e.g., secure browser configured for an enterprise, such as the Talon Enterprise browser that is commercially available from Palo Alto Networks, Inc., or another secure enterprise browser can be similarly used), which can be deployed to enterprise users/devices that are accessing the enterprise network (e.g., using software distribution, mobile device management (MDM), VPN and/or network access control (NAC), and/or similar tools to distribute/enforce use of the enterprise browser for web browsing while connected to the enterprise network). For example, the disclosed techniques can be implemented in the Talon Enterprise browser, such as will be further described below.

In another example implementation, the disclosed visual deep learning for phishing detection can be applied for inline phishing detection that is implemented as a browser extension, or a plugin, in a remote-browser-isolation (RBI) environment (e.g., an RBI solution that is integrated with the Prisma™ Access SASE solution that is commercially available from Palo Alto Networks, Inc., or another RBI integrated SASE solution can be similarly used).

In yet another example implementation, the disclosed techniques for visual deep learning for inline phishing detection are deployed in a security platform (e.g., a Network Gateway Firewall (NGFW), or other computing entity that filters/monitors inline network traffic activity).

In yet another example implementation, the disclosed techniques for visual deep learning for inline phishing detection are deployed as a security service (e.g., an Advanced URL Filtering (AUF) service or other security/phishing related service).

As such, the disclosed techniques for visual deep learning for inline phishing detection facilitate improved coverage of phishing attacks for an increasing number of targets/brands. For example, the disclosed logo clustering techniques can provide coverage of thousands of target brands in the reference set, such as will be further described below. Also, due to the disclosed few-shot deep learning approach to logo matching, to add new brands to the disclosed visual deep learning for an inline phishing solution, new logos can be automatically added to the reference logo set without requiring retraining of the deep learning model for logo matching, such as will also be further described below.

In addition, the disclosed techniques for visual deep learning for inline phishing detection facilitate anti-cloaking. Specifically, given that the disclosed visual deep learning for inline phishing detection solution can be implemented in a browser, such as will be further described below with respect to various embodiments, the disclosed visual deep learning for inline phishing detection solution can continually scan a given web page for suspicious/phishing activity. Even after the initial page load, if there are captchas/click-throughs etc., the disclosed visual deep learning for inline phishing detection solution can monitor what is currently in the viewport at all times and analyze it for phishing content, such as further described below.

Moreover, the disclosed techniques for visual deep learning for inline phishing detection provide explainable phishing detection results. For example, given that the disclosed visual deep learning for inline phishing detection solution uses object detection and recognition, and given that it can identify the brand being targeted based on the extracted logos, the disclosed visual deep learning for inline phishing detection solution can also provide the user with a full visualization of the components that explain why the web page was detected as phishing. Also, the brands can be categorized to facilitate explainability and security rule/policy based on the category associated with a brand targeted by a phishing web page (e.g., example categories can include enterprise, social media, banking/financial, online shopping, etc.).

Further, the disclosed techniques for visual deep learning for inline phishing detection provide a flexible solution. For example, given that the disclosed visual deep learning for inline phishing detection solution can be executed in a browser, such as further described below, a warning can be injected at the top of a web page if the web page is detected to be a phishing page (e.g., rather than simply blocking the page entirely). As such, this can make false positives (FPs) less impactful (e.g., as the user can still access the page, but the warning may make the user pay more attention to the page and URL to ensure that it is legitimate prior to entering sensitive information, such as credentials/login information, etc.).

Further, the disclosed techniques for visual deep learning for inline phishing detection provide a robust phishing detection solution. For example, regardless of how the phishing web page is rendered (e.g., VNC, JavaScript (JS), obfuscated HTML, etc.), the disclosed visual deep learning for inline phishing detection solution can detect it (e.g., if it has the relevant reference logo in its reference logo set, such as will be further described below). Generally, attackers have many ways of hiding their attack within the HTML, JS, etc. To combat this, the disclosed techniques are based on a "what you see is what you get" approach to visual phishing detection. As such, what the user sees is just the visual content that is shown on the viewport. By taking a visual approach, the disclosed visual deep learning for inline phishing detection solution is analyzing the page at the level that is as close to the end-user's point-of-view as possible.

Accordingly, new and improved security solutions that perform visual deep learning for inline phishing detection are disclosed in accordance with some embodiments.

These and other embodiments and examples for visual deep learning for inline phishing detection will be further described below.

Example System Embodiments for Visual Deep Learning for Inline Phishing Detection Accordingly, in some embodiments, the disclosed techniques include providing a security platform (e.g., the security function(s)/platform(s) can be implemented using a firewall (FW)/Next Generation Firewall (NGFW), a network sensor acting on behalf of the firewall, or another (virtual) device/component that can implement security policies using the disclosed techniques, such as PANOS executing on a virtual/physical NGFW solution commercially available from Palo Alto Networks, Inc. or another security platform/NFGW, including, for example, Palo Alto Networks' PA Series next generation firewalls, Palo Alto Networks' VM Series virtualized next generation firewalls, and CN Series container next generation firewalls, and/or other commercially available virtual-based or container-based firewalls can similarly be implemented and configured to perform the disclosed techniques) configured to provide DPI capabilities (e.g., including stateful inspection) which, for example, can be provided in part or in whole as a SASE security solution, in which the cloud-based security solution (e.g., SASE) can be monitored using the disclosed techniques for an application access analyzer, as further described below.

FIG. 1 illustrates an example of an environment in which malicious applications ("malware") are detected and prevented from causing harm. As will be described in more detail below, malware classifications (e.g., as made by security platform 122) can be variously shared and/or refined among various entities included in the environment shown in FIG. 1. And, using techniques described herein, devices, such as endpoint client devices 104-110, can be protected from such malware (e.g., including previously unknown/new variants of malware, such as C2 malware).

"Malware" as used herein refers to an application that engages in behaviors, whether clandestinely or not (and whether illegal or not), of which a user does not approve/would not approve if fully informed. Examples of malware include ransomware, Trojans, viruses, rootkits, spyware, hacking tools, etc. One example of malware is a desktop/mobile application that encrypts a user's stored data (e.g., ransomware). Another example of malware is C2 malware, such as similarly described above. Other forms of malware (e.g., keyloggers) can also be detected/thwarted using the disclosed techniques for sample traffic based self-learning malware detection as will be further described herein.

Techniques described herein can be used in conjunction with a variety of platforms (e.g., servers, computing appliances, virtual/container environments, desktops, mobile devices, gaming platforms, embedded systems, etc.) and/or for automated detection of a variety of forms of malware (e.g., new and/or variants of malware, such as C2 malware, etc.). In the example environment shown in FIG. 1, client devices 104-108 are a laptop computer, a desktop computer, and a tablet (respectively) present in an enterprise network 140. Client device 110 is a laptop computer present outside of enterprise network 140.

Data appliance 102 is configured to enforce policies regarding communications between client devices, such as client devices 104 and 106, and nodes outside of enterprise network 140 (e.g., reachable via external network 118). Examples of such policies include ones governing traffic shaping, quality of service, and routing of traffic. Other examples of policies include security policies such as ones requiring the scanning for threats in incoming (and/or outgoing) email attachments, website content, files exchanged through instant messaging programs, and/or other file transfers. In some embodiments, data appliance 102 is also configured to enforce policies with respect to traffic that stays within enterprise network 140.

Figure 2A:
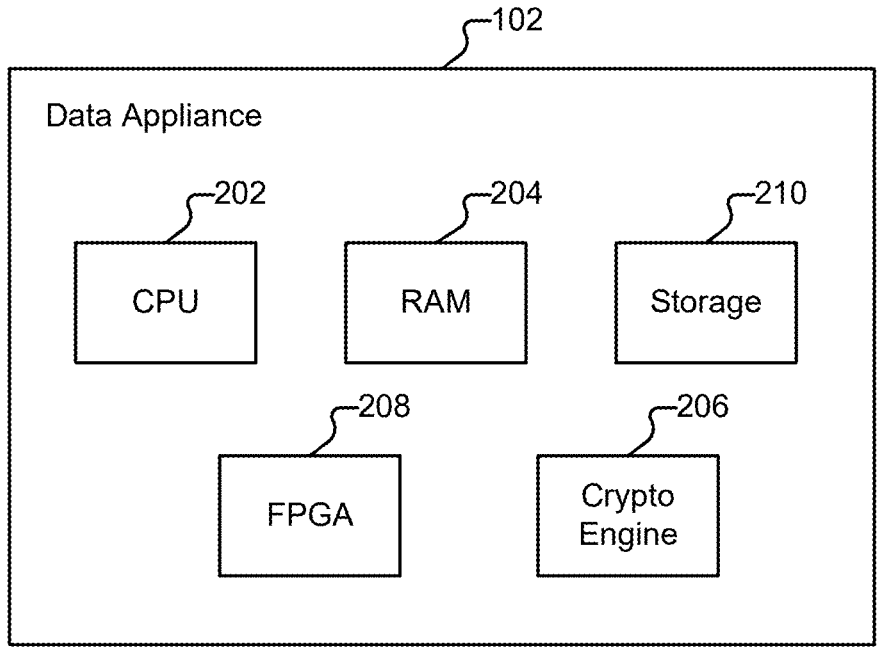
FIG. 2A illustrates an embodiment of a data appliance.

An embodiment of a data appliance is shown in FIG. 2A. The example shown is a representation of physical components that are included in data appliance 102, in various embodiments. Specifically, data appliance 102 includes a high performance multi-core Central Processing Unit (CPU) 202 and Random Access Memory (RAM) 204. Data appliance 102 also includes a storage 210 (such as one or more hard disks or solid state storage units). In various embodiments, data appliance 102 stores (whether in RAM 204, storage 210, and/or other appropriate locations) information used in monitoring enterprise network 140 and implementing disclosed techniques. Examples of such information include application identifiers, content identifiers, user identifiers, requested URLs, IP address mappings, policy and other configuration information, signatures, hostname/URL categorization information, malware profiles, and machine learning (ML) models (e.g., such as for sample traffic based self-learning malware detection). Data appliance 102 can also include one or more optional hardware accelerators. For example, data appliance 102 can include a cryptographic engine 206 configured to perform encryption and decryption operations, and one or more Field Programmable Gate Arrays (FPGAs) 208 configured to perform matching, act as network processors, and/or perform other tasks.

Functionality described herein as being performed by data appliance 102 can be provided/implemented in a variety of ways. For example, data appliance 102 can be a dedicated device or set of devices. The functionality provided by data appliance 102 can also be integrated into or executed as software on a general purpose computer, a computer server, a gateway, and/or a network/routing device. In some embodiments, at least some services described as being provided by data appliance 102 are instead (or in addition) provided to a client device (e.g., client device 104 or client device 110) by software executing on the client device.

Whenever data appliance 102 is described as performing a task, a single component, a subset of components, or all components of data appliance 102 may cooperate to perform the task. Similarly, whenever a component of data appliance 102 is described as performing a task, a subcomponent may perform the task and/or the component may perform the task in conjunction with other components. In various embodiments, portions of data appliance 102 are provided by one or more third parties. Depending on factors such as the amount of computing resources available to data appliance 102, various logical components and/or features of data appliance 102 may be omitted and the techniques described herein adapted accordingly. Similarly, additional logical components/features can be included in embodiments of data appliance 102 as applicable. One example of a component included in data appliance 102 in various embodiments is an application identification engine which is configured to identify an application (e.g., using various application signatures for identifying applications based on packet flow analysis). For example, the application identification engine can determine what type of traffic a session involves, such as Web Browsing-Social Networking; Web Browsing-News; SSH; and so on.

Figure 2B:
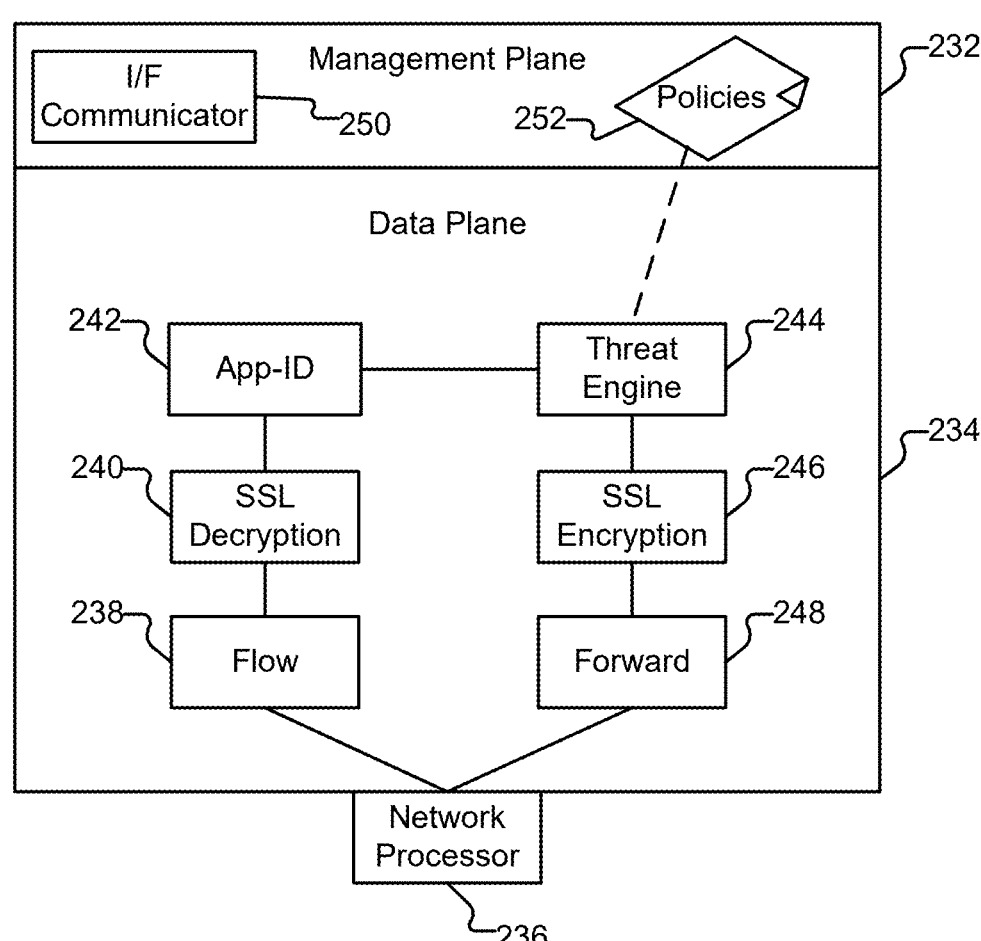
FIG. 2B is a functional diagram of logical components of an embodiment of a data appliance.

FIG. 2B is a functional diagram of logical components of an embodiment of a data appliance. The example shown is a representation of logical components that can be included in data appliance 102 in various embodiments. Unless otherwise specified, various logical components of data appliance 102 are generally implementable in a variety of ways, including as a set of one or more scripts (e.g., written in Java, python, etc., as applicable).

As shown, data appliance 102 comprises a firewall, and includes a management plane 232 and a data plane 234. The management plane is responsible for managing user interactions, such as by providing a user interface for configuring policies and viewing log data. The data plane is responsible for managing data, such as by performing packet processing and session handling.

Network processor 236 is configured to receive packets from client devices, such as client device 108, and provide them to data plane 234 for processing. Whenever flow module 238 identifies packets as being part of a new session, it creates a new session flow. Subsequent packets will be identified as belonging to the session based on a flow lookup. If applicable, SSL decryption is applied by SSL decryption engine 240. Otherwise, processing by SSL decryption engine 240 is omitted. Decryption engine 240 can help data appliance 102 inspect and control SSL/TLS and SSH encrypted traffic, and thus help to stop threats that might otherwise remain hidden in encrypted traffic. Decryption engine 240 can also help prevent sensitive content from leaving enterprise network 140. Decryption can be controlled (e.g., enabled or disabled) selectively based on parameters such as: URL category, traffic source, traffic destination, user, user group, and port. In addition to decryption policies (e.g., that specify which sessions to decrypt), decryption profiles can be assigned to control various options for sessions controlled by the policy. For example, the use of specific cipher suites and encryption protocol versions can be required.

Application identification (APP-ID) engine 242 is configured to determine what type of traffic a session involves. As one example, application identification engine 242 can recognize a GET request in received data and conclude that the session requires an HTTP decoder. In some cases, such as a web browsing session, the identified application can change, and such changes will be noted by data appliance 102. For example, a user may initially browse to a corporate Wiki (classified based on the URL visited as "Web Browsing-Productivity") and then subsequently browse to a social networking site (classified based on the URL visited as "Web Browsing-Social Networking"). Distinct types of protocols have corresponding decoders.

Based on the determination made by application identification engine 242, the packets are sent, by threat engine 244, to an appropriate decoder configured to assemble packets (which may be received out of order) into the correct order, perform tokenization, and extract out information. Threat engine 244 also performs signature matching to determine what should happen to the packet. As needed, SSL encryption engine 246 can re-encrypt decrypted data. Packets are forwarded using a forward module 248 for transmission (e.g., to a destination).

As also shown in FIG. 2B, policies 252 are received and stored in management plane 232. Policies can include one or more rules, which can be specified using domain and/or host/server names, and rules can apply one or more signatures or other matching criteria or heuristics, such as for security policy enforcement for subscriber/IP flows based on various extracted parameters/information from monitored session traffic flows. Example policies can include C2 malware detection policies using the disclosed techniques for sample traffic based self-learning malware detection. An interface (I/F) communicator 250 is provided for management communications (e.g., via (REST) APIs, messages, or network protocol communications or other communication mechanisms).

Security Platform

Returning to FIG. 1, suppose a malicious individual (using system 120) has created malware 130, such as malware for a malicious web campaign (e.g., the malware can be delivered to endpoint devices of users via a compromised website when the user visits/browses to the compromised website or via a phishing attack, etc.). The malicious individual hopes that a client device, such as client device 104, will execute a copy of malware 130 to unpack the malware executable/payload, compromising the client device, and, e.g., causing the client device to become a bot in a botnet. The compromised client device can then be instructed to perform tasks (e.g., cryptocurrency mining, or participating in denial of service attacks) and to report information to an external entity, such as command and control (C2/C&C) server 150, as well as to receive instructions from C2 server 150, as applicable.

Suppose data appliance 102 has intercepted an email sent (e.g., by system 120) to a user, "Alice," who operates client device 104. In this example, Alice receives the email and clicks on the link to a phishing/compromised site that could result in an attempted download of malware 130 by Alice's client device 104. However, in this example, data appliance 102 can perform the disclosed techniques for sample traffic based self-learning malware detection and block access from Alice's client device 104 to the packed malware content and to thereby preempt and prevent any such download of malware 130 to Alice's client device 104. As will be further described below, data appliance 102 performs the disclosed techniques for sample traffic based self-learning malware detection, such as further described below, to detect and block such malware 130 from harming Alice's client device 104.

As shown, data appliance 102 includes a malware analysis module 112. In an example implementation, malware analysis module 112 performs visual deep learning for inline phishing detection. In this example implementation, the malware analysis module implements the disclosed techniques for visual deep learning for inline phishing detection as similarly described above and further described below with respect to various embodiments.

In various embodiments, data appliance 102 is configured to work in cooperation with security platform 122. As one example, security platform 122 can provide to data appliance 102 a set of signatures of known-malicious files (e.g., as part of a subscription). If a signature for malware 130 is included in the set (e.g., an MD5 hash of malware 130), data appliance 102 can prevent the transmission of malware 130 to client device 104 accordingly (e.g., by detecting that an MD5 hash of the email attachment sent to client device 104 matches the MD5 hash of malware 130). Security platform 122 can also provide to data appliance 102 a list of known malicious domains and/or IP addresses, allowing data appliance 102 to block traffic between enterprise network 140 and C2 server 150 (e.g., where C&C server 150 is known to be malicious). The list of malicious domains (and/or IP addresses) can also help data appliance 102 determine when one of its nodes has been compromised. For example, if client device 104 attempts to contact C2 server 150, such attempt is a strong indicator that client 104 has been compromised by malware (and remedial actions should be taken accordingly, such as quarantining client device 104 from communicating with other nodes within enterprise network 140).

As will be described in more detail below, security platform 122 can also receive a copy of malware 130 from data appliance 102 to perform cloud-based security analysis for performing sample traffic based self-learning malware detection, and the malware verdict can be sent back to data appliance 102 for enforcing the security policy to thereby safeguard Alice's client device 104 from execution of malware 130 (e.g., to block malware 130 from access on client device 104).

A variety of actions can be taken by data appliance 102 if no signature for an attachment is found, in various embodiments. As a first example, data appliance 102 can fail-safe, by blocking transmission of any attachments not allow-listed as benign (e.g., not matching signatures of known good files). A drawback of this approach is that there may be many legitimate attachments unnecessarily blocked as potential malware when they are in fact benign. As a second example, data appliance 102 can fail-danger by allowing transmission of any attachments not block-listed as malicious (e.g., not matching signatures of known bad files). A drawback of this approach is that newly created malware (previously unseen by platform 122) will not be prevented from causing harm. As a third example, data appliance 102 can be configured to provide the file (e.g., malware 130) to security platform 122 for static/dynamic analysis, to determine whether it is malicious and/or to otherwise classify it.

Security platform 122 stores copies of received samples in storage 142 and analysis is commenced (or scheduled, as applicable). One example of storage 142 is an Apache Hadoop Cluster (HDFS). Results of analysis (and additional information pertaining to the applications) are stored in database 146. In the event an application is determined to be malicious, data appliances can be configured to automatically block the file download based on the analysis result. Further, a signature can be generated for the malware and distributed (e.g., to data appliances such as data appliances 102, 136, and 148) to automatically block future file transfer requests to download the file determined to be malicious.

In various embodiments, security platform 122 comprises one or more dedicated commercially available hardware servers (e.g., having multi-core processor(s), 32G+ of RAM, gigabit network interface adaptor(s), and hard drive(s)) running typical server-class operating systems (e.g., Linux). Security platform 122 can be implemented across a scalable infrastructure comprising multiple such servers, solid state drives, and/or other applicable high-performance hardware. Security platform 122 can comprise several distributed components, including components provided by one or more third parties. For example, portions or all of security platform 122 can be implemented using the Amazon Elastic Compute Cloud (EC2) and/or Amazon Simple Storage Service (S3). Further, as with data appliance 102, whenever security platform 122 is referred to as performing a task, such as storing data or processing data, it is to be understood that a sub-component or multiple sub-components of security platform 122 (whether individually or in cooperation with third party components) may cooperate to perform that task. As one example, security platform 122 can optionally perform static/dynamic analysis in cooperation with one or more virtual machine (VM) servers, such as VM server 124.

An example of a virtual machine server is a physical machine comprising commercially available server-class hardware (e.g., a multi-core processor, 32+ Gigabytes of RAM, and one or more Gigabit network interface adapters) that runs commercially available virtualization software, such as VMware ESXi, Citrix XenServer, or Microsoft Hyper-V. In some embodiments, the virtual machine server is omitted. Further, a virtual machine server may be under the control of the same entity that administers security platform 122, but may also be provided by a third party. As one example, the virtual machine server can rely on EC2, with the remainder portions of security platform 122 provided by dedicated hardware owned by and under the control of the operator of security platform 122. VM server 124 is configured to provide one or more virtual machines 126-128 for emulating client devices. The virtual machines can execute a variety of operating systems and/or versions thereof. Observed behaviors resulting from executing applications in the virtual machines are logged and analyzed (e.g., for indications that the application is malicious). In some embodiments, log analysis is performed by the VM server (e.g., VM server 124). In other embodiments, analysis is performed at least in part by other components of security platform 122, such as a coordinator 144.

In various embodiments, security platform 122 makes available results of its analysis of samples via a list of signatures (and/or other identifiers) to data appliance 102 as part of a subscription. For example, security platform 122 can periodically send a content package that identifies malware files, including for network traffic based heuristic IPS malware detection, etc. (e.g., daily, hourly, or some other interval, and/or based on an event configured by one or more policies). The subscription can cover the analysis of just those files intercepted by data appliance 102 and sent to security platform 122 by data appliance 102, and can also cover signatures of malware known to security platform 122.

In various embodiments, security platform 122 is configured to provide security services to a variety of entities in addition to (or, as applicable, instead of) an operator of data appliance 102. For example, other enterprises, having their own respective enterprise networks 114 and 116, and their own respective data appliances 136 and 148, can contract with the operator of security platform 122. Other types of entities can also make use of the services of security platform 122. For example, an Internet Service Provider (ISP) providing Internet service to client device 110 can contract with security platform 122 to analyze applications which client device 110 attempts to download. As another example, the owner of client device 110 can install software on client device 110 that communicates with security platform 122 (e.g., to receive content packages from security platform 122, use the received content packages to check attachments in accordance with techniques described herein, and transmit applications to security platform 122 for analysis).

Analyzing Samples Using Static/Dynamic Analysis

Figure 3:
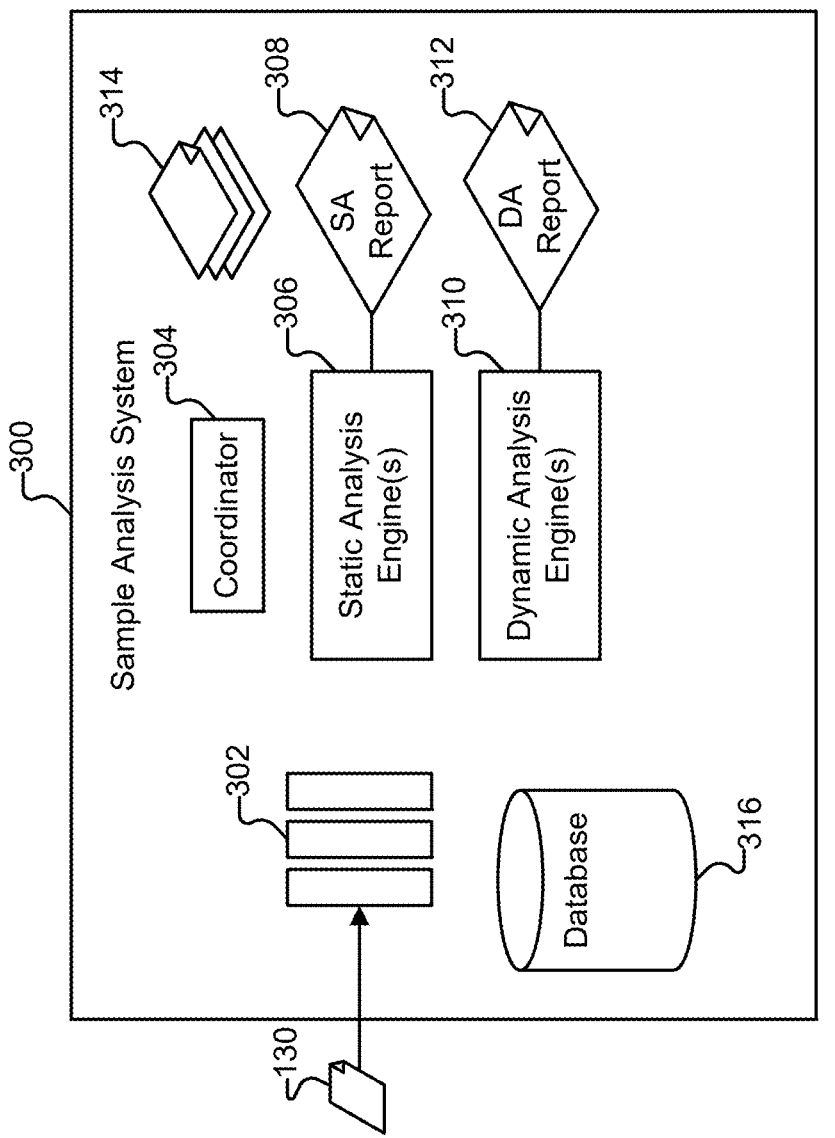
FIG. 3 illustrates an example of logical components that can be included in a system for analyzing samples.

FIG. 3 illustrates an example of logical components that can be included in a system for analyzing samples. Analysis system 300 can be implemented using a single device. For example, the functionality of analysis system 300 can be implemented in a malware analysis module 112 incorporated into data appliance 102. Analysis system 300 can also be implemented, collectively, across multiple distinct devices. For example, the functionality of analysis system 300 can be provided by security platform 122.

In various embodiments, analysis system 300 makes use of lists, databases, or other collections of known safe content and/or known bad content (e.g., collectively shown in FIG. 3 as collection 314). Collection 314 can be obtained in a variety of ways, including via a subscription service (e.g., provided by a third party) and/or as a result of other processing (e.g., performed by data appliance 102 and/or security platform 122). Examples of information included in collection 314 are: URLs, domain names, and/or IP addresses of known malicious servers; URLs, domain names, and/or IP addresses of known safe servers; URLs, domain names, and/or IP addresses of known command and control (C2/C&C) domains; signatures, hashes, and/or other identifiers of known malicious applications; signatures, hashes, and/or other identifiers of known safe applications; signatures, hashes, and/or other identifiers of known malicious files (e.g., OS exploit files); signatures, hashes, and/or other identifiers of known safe libraries; and signatures, hashes, and/or other identifiers of known malicious libraries.

In various embodiments, when a new sample is received for analysis (e.g., an existing signature associated with the sample is not present in analysis system 300), it is added to queue 302. As shown in FIG. 3, application 130 is received by system 300 and added to queue 302.

Coordinator 304 monitors queue 302, and as resources (e.g., a static analysis worker) become available, coordinator 304 fetches a sample from queue 302 for processing (e.g., fetches a copy of malware 130). In particular, coordinator 304 first provides the sample to static analysis engine 306 for static analysis. In some embodiments, one or more static analysis engines are included within analysis system 300, where analysis system 300 is a single device. In other embodiments, static analysis is performed by a separate static analysis server that includes a plurality of workers (i.e., a plurality of instances of static analysis engine 306).

The static analysis engine obtains general information about the sample, and includes it (along with heuristic and other information, as applicable) in a static analysis report 308. The report can be created by the static analysis engine, or by coordinator 304 (or by another appropriate component) which can be configured to receive the information from static analysis engine 306. As an example, static analysis of malware can include performing a signature-based analysis. In some embodiments, the collected information is stored in a database record for the sample (e.g., in database 316), instead of or in addition to a separate static analysis report 308 being created (i.e., portions of the database record form the report 308). In some embodiments, the static analysis engine also forms a verdict with respect to the application (e.g., "safe," "suspicious," or "malicious"). As one example, the verdict can be "malicious" if even one "malicious" static feature is present in the application (e.g., the application includes a hard link to a known malicious domain). As another example, points can be assigned to each of the features (e.g., based on severity if found; based on how reliable the feature is for predicting malice; etc.) and a verdict can be assigned by static analysis engine 306 (or coordinator 304, if applicable) based on the number of points associated with the static analysis results.

Once static analysis is completed, coordinator 304 locates an available dynamic analysis engine 310 to perform dynamic analysis on the application. As with static analysis engine 306, analysis system 300 can include one or more dynamic analysis engines directly. In other embodiments, dynamic analysis is performed by a separate dynamic analysis server that includes a plurality of workers (i.e., a plurality of instances of dynamic analysis engine 310).

Each dynamic analysis worker manages a virtual machine instance (e.g., emulation/sandbox analysis of samples for malware detection, such as the above-described C2 malware detection based on monitored network traffic activity). In some embodiments, results of static analysis (e.g., performed by static analysis engine 306), whether in report form (308) and/or as stored in database 316, or otherwise stored, are provided as input to dynamic analysis engine 310. For example, the static report information can be used to help select/customize the virtual machine instance used by dynamic analysis engine 310 (e.g., Microsoft Windows 7 SP 2 vs. Microsoft Windows 10 Enterprise, or iOS 11.0 vs. iOS 12.0). Where multiple virtual machine instances are executed at the same time, a single dynamic analysis engine can manage all of the instances, or multiple dynamic analysis engines can be used (e.g., with each managing its own virtual machine instance), as applicable. As will be explained in more detail below, during the dynamic portion of the analysis, actions taken by the application (including network activity) are analyzed.

In various embodiments, static analysis of a sample is omitted or is performed by a separate entity, as applicable. As one example, traditional static and/or dynamic analysis may be performed on files by a first entity. Once it is determined (e.g., by the first entity) that a given file is malicious, the file can be provided to a second entity (e.g., the operator of security platform 122) specifically for additional analysis with respect to the malware's use of network activity (e.g., by a dynamic analysis engine 310).

The environment used by analysis system 300 is instrumented/hooked such that behaviors observed while the application is executing are logged as they occur (e.g., using a customized kernel that supports hooking and logcat). Network traffic associated with the emulator is also captured (e.g., using pcap). The log/network data can be stored as a temporary file on analysis system 300, and can also be stored more permanently (e.g., using HDFS or another appropriate storage technology or combinations of technology, such as MongoDB). The dynamic analysis engine (or another appropriate component) can compare the connections made by the sample to lists of domains, IP addresses, etc. (314) and determine whether the sample has communicated (or attempted to communicate) with malicious entities.

As with the static analysis engine, the dynamic analysis engine stores the results of its analysis in database 316 in the record associated with the application being tested (and/or includes the results in report 312 as applicable). In some embodiments, the dynamic analysis engine also forms a verdict with respect to the application (e.g., "safe," "suspicious," or "malicious"). As one example, the verdict can be "malicious" if even one "malicious" action is taken by the application (e.g., an attempt to contact a known malicious domain is made, or an attempt to exfiltrate sensitive information is observed). As another example, points can be assigned to actions taken (e.g., based on severity if found; based on how reliable the action is for predicting malice; etc.) and a verdict can be assigned by dynamic analysis engine 310 (or coordinator 304, if applicable) based on the number of points associated with the dynamic analysis results. In some embodiments, a final verdict associated with the sample is made based on a combination of report 308 and report 312 (e.g., by coordinator 304).

New and Evolving Phishing Attacks

Figure 4:
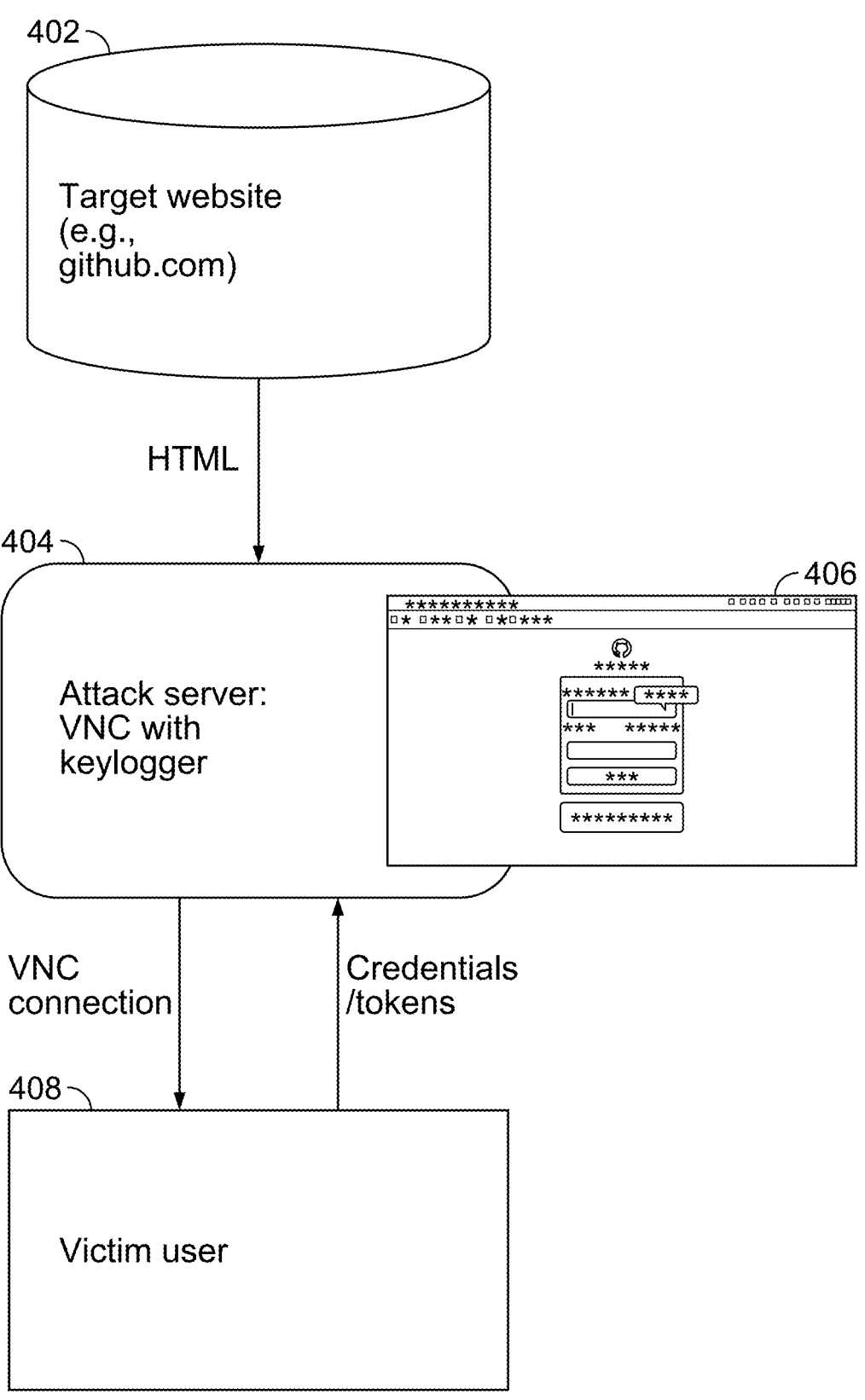
FIG. 4 illustrates a visual man in the middle (MitM) phishing attack.

FIG. 4 illustrates a visual man in the middle (MitM) phishing attack. Common phishing attacks have typically relied on HTML content, including the raw HTML and HTTP headers. The use of such HTML content (e.g., raw HTML and HTTP headers) as indicators of potential phishing attacks can often detect certain types of phishing attacks that do not utilize an intermediary, MitM phishing attack server (e.g., using a VNC-based MitM phishing attack server, such as shown in FIG. 4) to render the HTML content that is then sent to the target user's browser as visual data (e.g., pixels) rather than sending the original HTML content to the victim user's browser to locally render the visual data (e.g., pixels). In these scenarios, there is now raw HTML for phishing/security analysis. Moreover, there are no HTTP headers in such scenarios that can be used for detecting these types of evolving, more sophisticated phishing attacks.

As shown in FIG. 4, a login page 406 for a target website 402 (e.g., github.com) can be spoofed using an attack server 404 (e.g., VNC with keylogger, using publicly available phishing platforms, such as EvilnoVNC, is which publicly available at https://github.com/JoelGMSec/EvilnoVNC) to attempt to trick a victim user 408 into entering their credentials/tokens into the spoofed login page for the target website, which can then be comprised by the phishing attacker at the attack server.

As such, phishing attacks are evolving and becoming more sophisticated. These evolving phishing attacks present new technical challenges in effectively and efficiently detecting such phishing attacks.

The disclosed techniques for visual deep learning for inline phishing detection will now be further described below with respect to various system embodiments.

Visual Deep Learning for Inline Phishing Detection

In an example implementation, visual deep learning for inline phishing detection provides a solution for visual inline phishing detection. As an overview, in a first stage of processing, a series of deep learning models are applied to extract key components from a screenshot of a web page. For example, logos, input forms, buttons, and/or other components can be automatically extracted from a screen shot of a web page, such as further described below with respect to FIG. 5.

This extracted information is provided as input into a classifier to determine if the web page is a credential input page or not. Also, another machine learning (ML) model (e.g., a Siamese neural network that can be used to compute numerical embeddings for images, which is an open source neural network model, which is publicly available at https://github.com/lindsey98/PhishIntention) is used to automatically match the extracted logos to an existing reference set of known target brand logos, such as further described below with respect to FIG. 6. If the logo matches a known target brand, but the uniform resource locator (URL) is not owned by that target brand, and if the web page is a credential input web page (e.g., a login associated web page), then it is determined that the web page is a phishing page targeting the identified brand, such as will also be further described below with respect to various embodiments.

Figure 5:
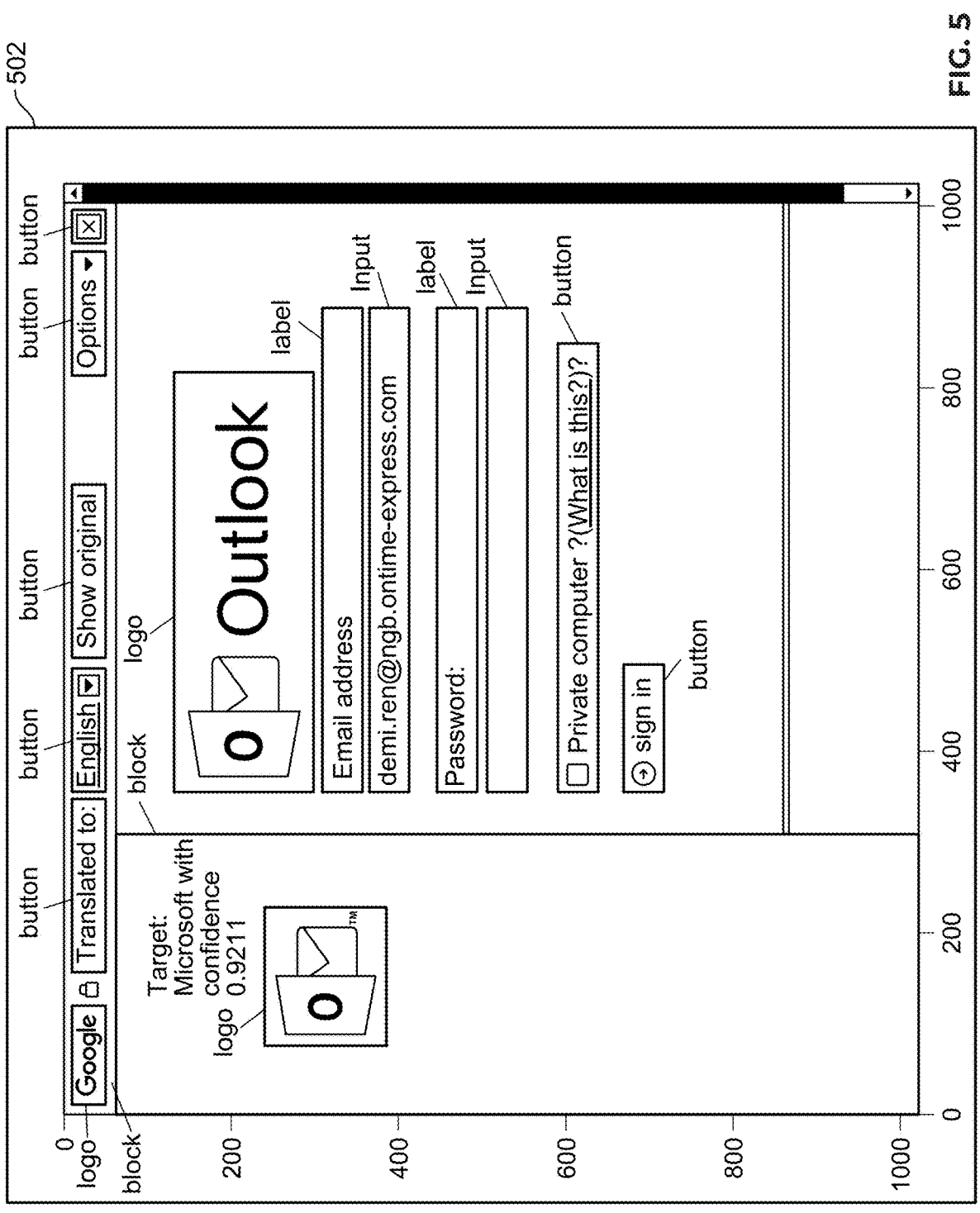
FIG. 5 illustrates visual web page elements extraction for providing a few-shot learning solution for visual phishing detection in accordance with some embodiments.

FIG. 5 illustrates visual web page elements extraction for providing a few-shot learning solution for visual phishing detection in accordance with some embodiments. In an example implementation, PhishID, a few-shot learning-based solution for visual phishing detection and target brand identification, is applied and, as further discussed below, can be used as part of the disclosed visual deep learning for inline phishing detection techniques.

Referring to FIGS. 5, 502 and 504 are example screenshots of web pages (e.g., credential/login web pages). The logos and other web page elements, such as a login form, input box, button, block, level, etc., can be automatically extracted using an extractor tool, such as a publicly or commercially available extractor tool (e.g., an open source logo extractor tool that can be used is Phish Intention, which is publicly available at https://github.com/lindsey98/PhishIntention).

In this example implementation, if (1) a key logo extracted from the screen shot of the web page matches a known brand (e.g., a protected brand, such as will be further described below); (2) the screenshot also includes a login form, and (3) the domain of the web page does not match a legitimate domain (e.g., a known domain associated with the phishing brand, such as further described below), then a phishing detection can be determined. Each of these processing operations will be further described below with respect to various embodiments.

Figure 6:
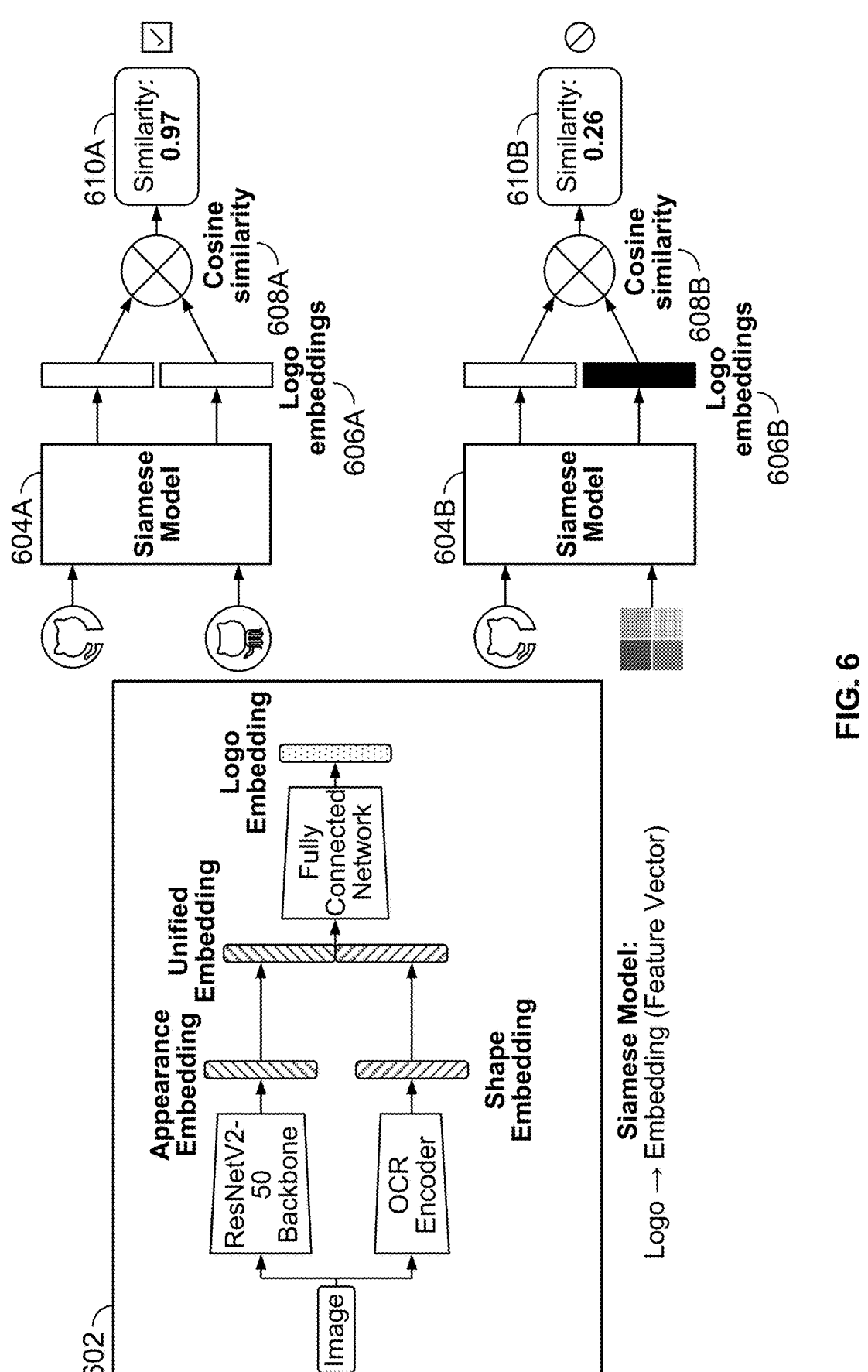
FIG. 6 illustrates visual-based logo matching for providing a few-shot learning solution for visual phishing detection in accordance with some embodiments.

FIG. 6 illustrates visual-based logo matching for providing a few-shot learning solution for visual phishing detection in accordance with some embodiments. In this example implementation, the extracted logos, such as the logos extracted from screen shots of credential/login pages as similarly described above with respect to FIG. 5, are provided as input into a visual-based logo matching model as will now be described with respect to FIG. 6.

Referring to FIG. 6, a visual-based logo matching model 602 receives as input the extracted logos, such as the logos extracted from screen shots of credential/login pages as similarly described above with respect to FIG. 5. In this example implementation, the visual-based logo matching model is the Siamese neural network model, which is an open source visual-based matching model that is publicly available at https://github.com/lindsey98/PhishIntention. The Siamese model receives the extracted logo as input, and passes it through two different "encoder" sub-networks to generate an "appearance" embedding and a "shape" embedding. The output of these embedding operations are two numerical feature vectors, which are then combined to generate a unified embedding (e.g., a combined numerical feature vector), which is then input into the fully connected neural network to generate a logo embedding as shown at 602 in FIG. 6.

As shown at 604A and 604B, if two logos are similar, then they can both be provided as input through the Siamese model to compare their respective logo embeddings, such as shown at 606A and 606B (e.g., comparing two GitHub related logos and comparing the GitHub and Microsoft related logos, respectively). The pairwise similarity of these respective logo embeddings is determined using a cosine similarity function as shown at 608A and 608B, respectively.

As shown at 610A and 610B, the results of the cosine similarity results are provided for these respective logo comparisons using the Siamese model. In these example results, the similarity score for the two GitHub related logos is 0.97, which exceeds an example threshold match (e.g., a threshold score can be 0.90 or some other configurable value), and thus indicates that such is a logo match (e.g., it is determined that these are likely variants of the same logo, and, thus, likely belong or are associated with the same brand for that logo). However, the similarity score for the GitHub related logo and the Microsoft related logo is only 0.26, which is well below the example threshold match, and thus, indicates that such is not a logo match.

Figure 7:
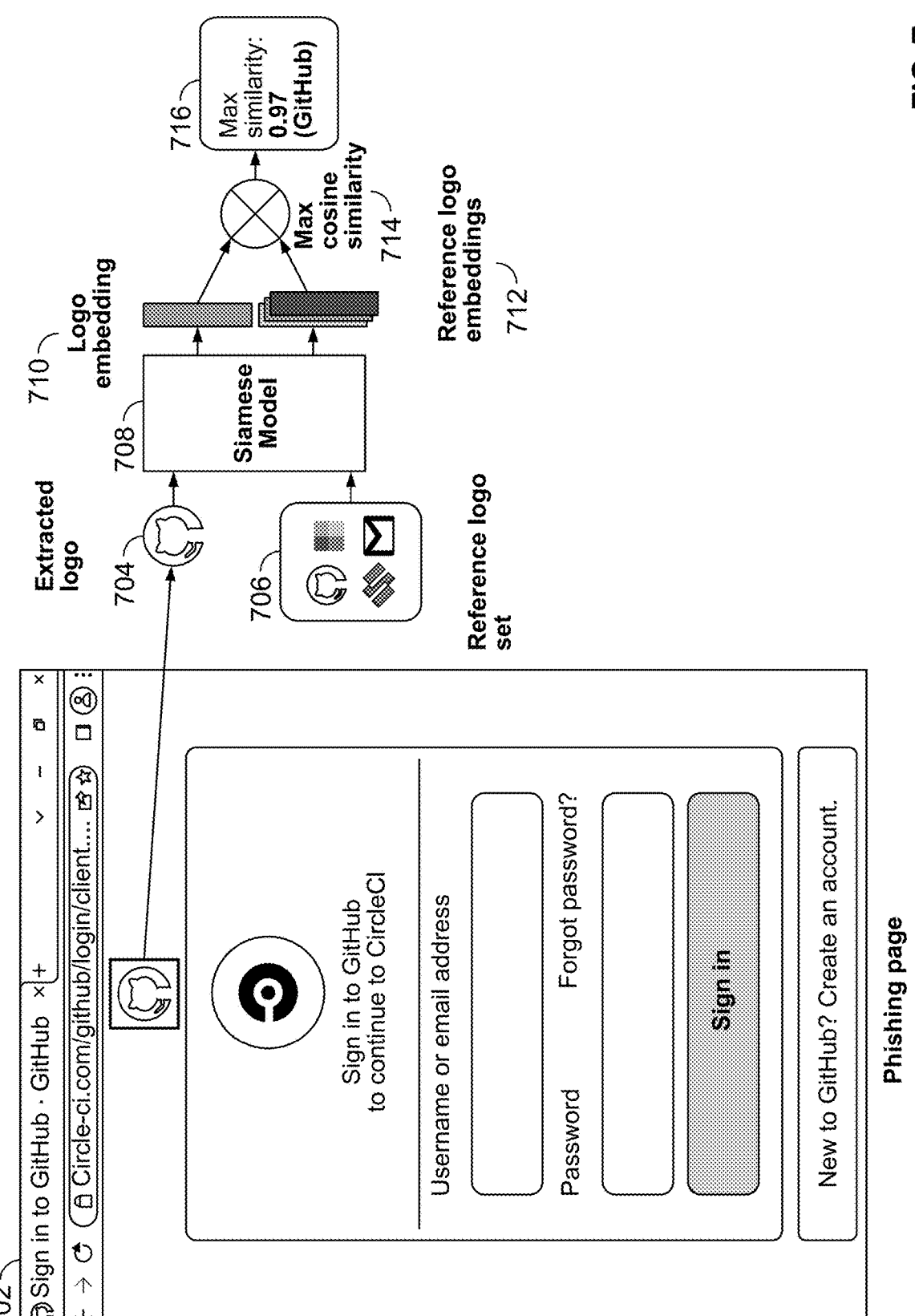
FIG. 7 illustrates visual-based logo matching for providing a few-shot learning solution for visual phishing detection using reference logo embeddings in accordance with some embodiments.

FIG. 7 illustrates visual-based logo matching for providing a few-shot learning solution for visual phishing detection using reference logo embeddings in accordance with some embodiments. In this example implementation, the above-described Siamese model for visual matching of logo embeddings is similarly applied as described above with respect to FIG. 6, but in this example implementation, the extracted logo from a potential phishing page is compared with a set of reference logo embeddings.

Specifically, the disclosed techniques for visual deep learning for inline phishing detection also include generating a reference set of logos. The reference set of logos, such as for protected brands (e.g., brands that are commonly targeted for various phishing campaigns, such as financial entity related logos, online shopping entity related logos, technology entity related logos, etc.) can then similarly be used for the matching operation using a visual-based model, such as the Siamese model or another similar ML-based visual matching model, as similarly discussed above with respect to FIG. 6. For example, an extracted logo can be compared to each of the reference logos in the reference logo set of images, such as will now be further described below with respect to FIG. 7.

Referring to FIG. 7, a logo is extracted from a potential phishing page 702. The extracted logo 704 (e.g., a GitHub related logo) as well as each of the reference logos from the reference logo set 706 (e.g., which can be generated automatically as similarly described below with respect to FIG. 8) are provided as input into the Siamese model 708 or another similar ML-based visual matching model, as similarly discussed above with respect to FIG. 6. The Siamese model outputs the logo embedding 710 and the reference logo embeddings 712.

As shown at 604A and 604B, if two logos are similar, then they can both be provided as input through the Siamese model to compare their respective logo embeddings, such as shown at 606A and 606B (e.g., comparing two GitHub related logos and comparing the GitHub and Microsoft related logos, respectively).

As shown at 714, the results of the cosine similarity results are provided for these respective logo comparisons using the Siamese model (e.g., comparing the logo embedding with each of the reference logo embeddings from the reference logo set). Specifically, the pairwise similarity of these respective logo embeddings is determined using a max cosine similarity function.

In this example result at 716, the similarity score for the extracted (GitHub related) logo embedding with one of the reference logo embeddings is 0.97, which exceeds an example threshold match (e.g., a threshold score can be 0.90 or some other configurable value), and thus indicates that such is a logo match (e.g., it is determined that these are likely variants of the same logo, and, thus, likely belong or are associated with the same brand for that logo). As such, the closest match to a reference set logo embedding that exceeds the logo match threshold is used to determine that the extracted logo is likely a variant of that reference logo. If the extracted components have, for example, one or more other components typically associated with a phishing page, such as an input component for credentials/login, then the result can be used to automatically determine that the web page is likely a phishing web page, such as further described herein.

Figure 8:
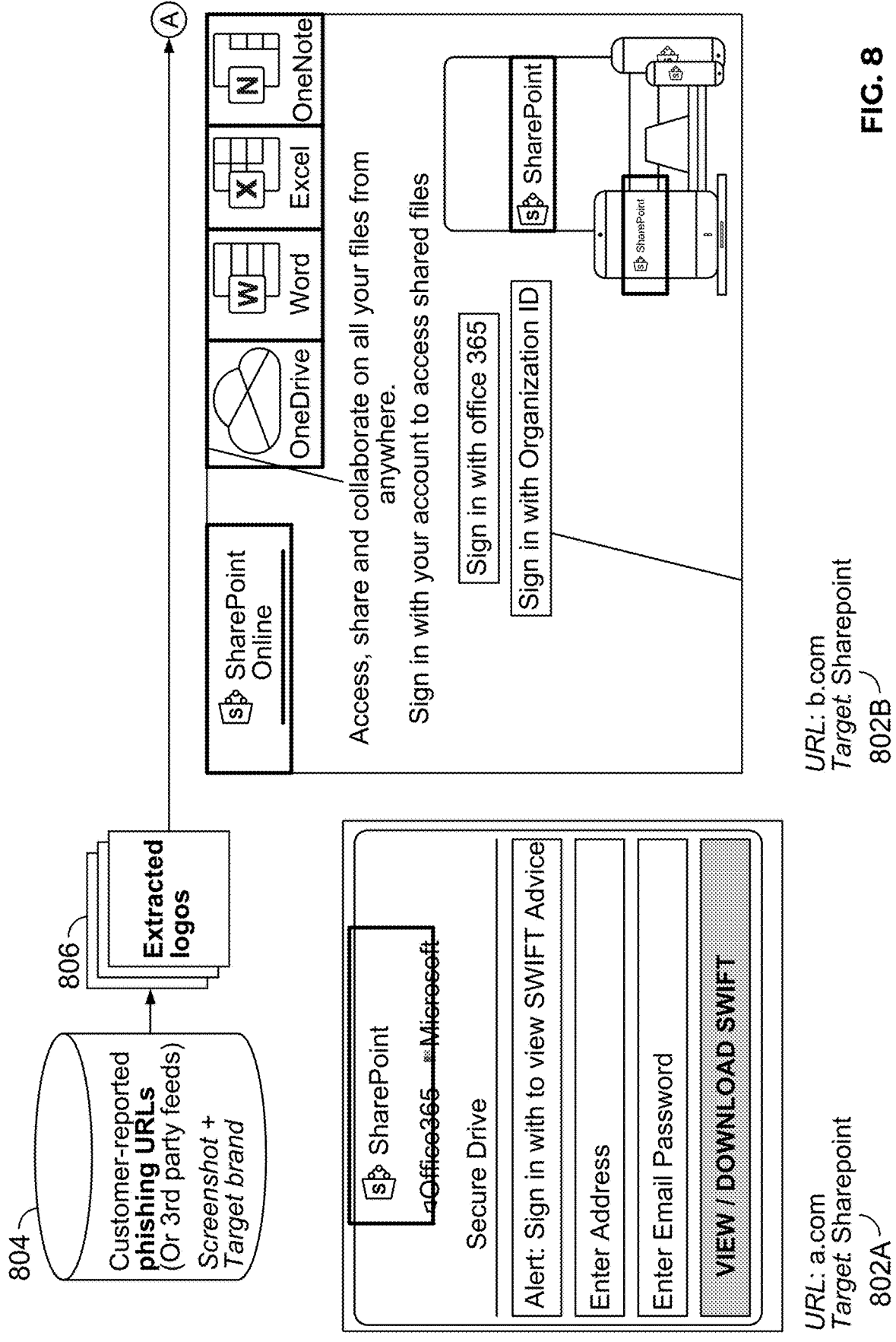
FIG. 8 illustrates a process for generating a logo reference set for providing a few-shot learning solution for visual phishing detection using reference logo embeddings in accordance with some embodiments.

FIG. 8 illustrates a process for generating a logo reference set for providing a few-shot learning solution for visual phishing detection using reference logo embeddings in accordance with some embodiments. Specifically, in this example implementation, the logo reference set is generated using clustering as will now be further described below with respect to FIG. 8.

Referring to FIG. 8, a new set of logos shown at 820, in this example for SharePoint, is to be added to the reference logo set. For example, we can utilize the extracted logos 806 from customer-reported phishing URLs (e.g., when a customer reported phishing URL is received, an editorial team can automatically review it and mark the target brand that they deemed to be the target of this phishing attack) and/or 3$^{rd}$ party feeds as shown at 804 to provide new potential reference logos to facilitate further automation of the expansion of the reference logo set. Examples of potential SharePoint related phishing page screenshots are shown at 802A and 802B, such as from customer-reported phishing URLs (or 3$^{rd}$ party feeds) as shown at 804.

In this example implementation, the Siamese neural network is executed on all of the logos shown at 806 to map each logo to a corresponding logo embedding. The logo embeddings can be represented as an "embedding space" (e.g., or "feature space") as shown at 808. As such, similar looking logos will have numerically similar embeddings.

As shown at 808, these resulting logo embeddings can then be clustered. In an example implementation, a centroid-based clustering algorithm (e.g., using a version of the K-means clustering algorithm or another clustering algorithm for embedding vectors can similarly be used to generate clusters of the logo embeddings) is applied to the logo embeddings to automatically augment a target brand set of reference logos. Specifically, in this example implementation, given the set of logo embeddings at 808, the centroid-based clustering algorithm can automatically identify clusters of logos with similar embeddings (e.g., corresponding to high visual similarity) and for clusters with high brand affinity (e.g., the majority of logos in that cluster came from a screenshot of a phishing web page targeting, for example, a well-known brand B, such as Microsoft SharePoint, according to the phishing target brand information shown at 804), automatically assign those logos to that brand B and add them to the reference set to augment future detections.

At 810, filtering by the cluster size and brand affinity is performed. First, we discard clusters with fewer than N member logos, in order to ensure that the member logos meet a minimum level of commonality. We also discard logo clusters with low brand affinity (e.g., the logos in the cluster that do not predominantly come from phishing web pages targeting a single target brand), given that we cannot, in such contexts, confidently determine a specific brand assignment (such as at 818). As also shown at this stage of processing, a deduplication by the embedding vector is performed at this stage of processing: for each new logo within the cluster, if the logo already matches (e.g., based on the cosine similarity of the embedding vector) to an existing logo in the reference set (e.g., or matches to another logo in the same cluster), we discard the new logo as shown at 812 (e.g., deduplication processing). As such, this allows us to add the minimum number of new logos needed to provide sufficient coverage over the entire cluster to generate the resulting reference logo set as shown at 814.

After the filtering and deduplication processing performed at 810, the remaining reference logo embeddings are added to the reference logo set as shown at 814 to automatically generate the resulting augmented target brand set of reference logos for use in the above-described visual deep learning for inline phishing detection techniques.

As such, the use of the reference logo set embeddings facilitates an effective and efficient solution for phishing brand identification using the disclosed visual-based deep learning for phishing detection.

Moreover, the use of the reference logo set facilitates an effective and efficient solution to detect new brands using the disclosed visual-based deep learning for phishing detection. Specifically, a new reference logo for a new brand can be added to the reference logo set using the above-described reference logo techniques to generate a new reference logo for embedding using the Siamese model and performing the above-described comparison without having to perform model retraining (e.g., and model versioning overhead based on new/updated training data sets, etc.), which saves computing and ML training related resources and time. For example, by applying the above-described logo reference set generation techniques, we can automatically augment brand coverage over time by using a daily feed of customer-reported phishing URLs.

Figure 9:
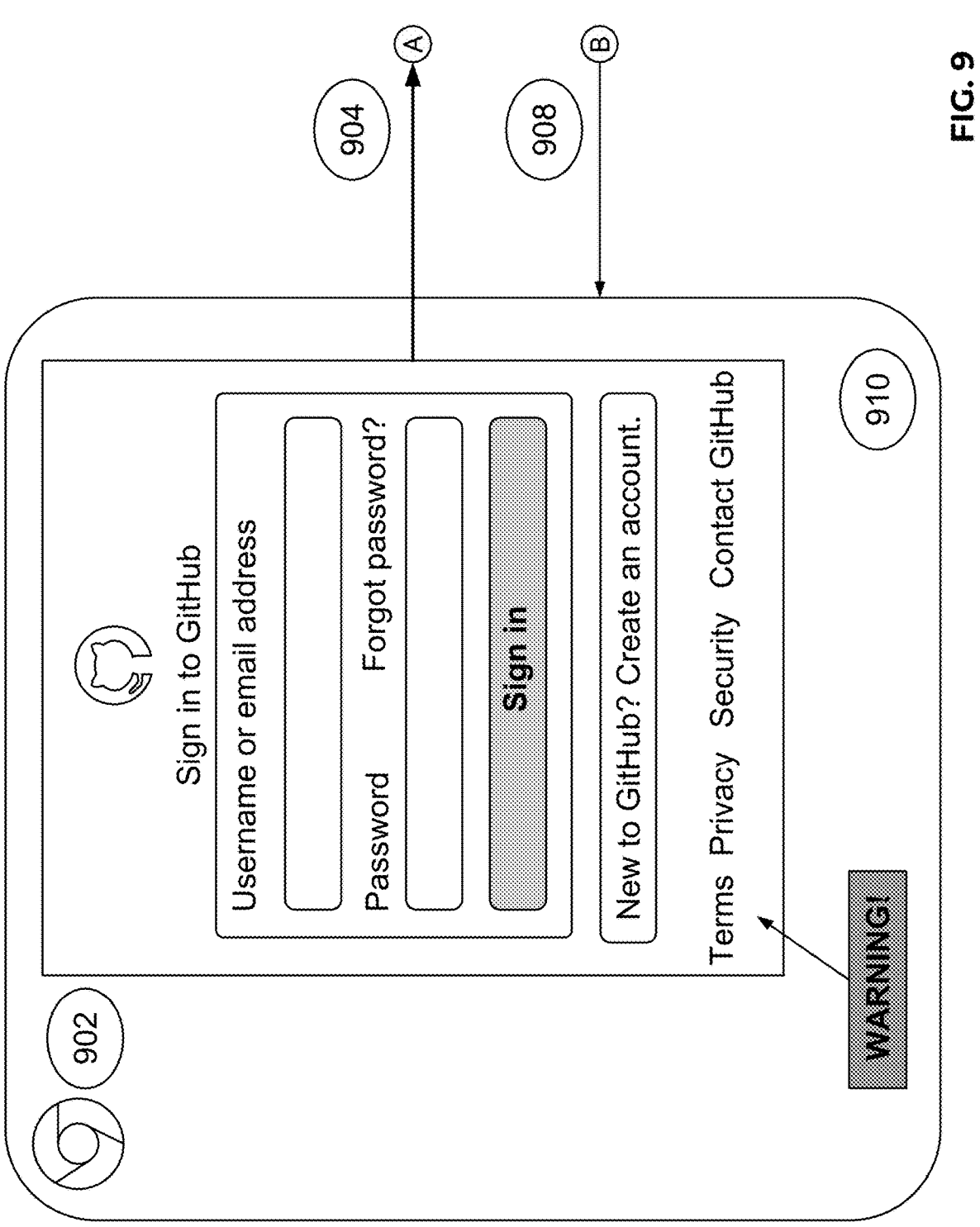
FIG. 9 illustrates an example implementation of visual deep learning for inline phishing detection using a web browser extension in accordance with some embodiments.

FIG. 9 illustrates an example implementation of visual deep learning for inline phishing detection using a web browser extension in accordance with some embodiments. In an example implementation, the disclosed techniques for providing visual deep learning for inline phishing detection can be implemented in a web browser extension (e.g., a Google Chrome browser extension, which can be executed in the Chrome extension or inside the browser, or an extension for another web browser can similarly be used), such as will now be further described below. In another example implementation, the disclosed visual deep learning for phishing detection can be applied for inline phishing detection that is implemented as a browser extension, or a plugin, in an enterprise browser (e.g., secure browser configured for an enterprise, such as the Talon Enterprise browser that is commercially available from Palo Alto Networks, Inc., or another secure enterprise browser can be similarly used), which can be deployed to enterprise users/devices that are accessing the enterprise network (e.g., using software distribution, mobile device management (MDM), VPN and/or network access control (NAC), and/or similar tools to distribute/enforce use of the enterprise browser for web browsing while connected to the enterprise network).

At 902, the browser extension captures content visible in the current viewport, such as by capturing a web page screenshot.

The browser extension then analyzes the captured content for phishing content, or alternatively, as shown at 904, the browser extension sends the content to an external server, such as a cloud security service server.

At 906, the captured content is automatically analyzed for phishing content using the disclosed visual deep learning for inline phishing detection techniques, such as similarly described above with respect to FIGS. 5-8.

At 908, the result of the visual deep learning for inline phishing detection analysis is returned to the browser extension as shown.

At 910, if it is determined that the page is a phishing page (e.g., based on the above-described visual deep learning for inline phishing techniques, such as similarly described above with respect to FIG. 7), it injects a warning at the top of the web page to warn the user that this may be a phishing page. Alternatively, other actions can be configured to be performed, such as to block the web page, drop the connection, log the session, quarantine the endpoint, and/or other actions can similarly be configured to be performed. In some cases, the action performed can be based on a security rule/policy, which can be based, for example, at least in part on the category of the phishing web page/brand, such as corporate/enterprise versus social media, etc.

As such, in addition, the disclosed techniques for visual deep learning for inline phishing detection facilitate anti-cloaking. Specifically, given that the disclosed visual deep learning for inline phishing detection solution can be implemented in a browser, such as will be further described below with respect to various embodiments, the disclosed visual deep learning for inline phishing detection solution can continually scan a given web page for suspicious/phishing activity. Even after the initial page load, if there are captchas/click-throughs etc., the disclosed visual deep learning for inline phishing detection solution can monitor what is currently in the viewport at all times and analyze it for phishing content, such as further described below.

Figure 10:
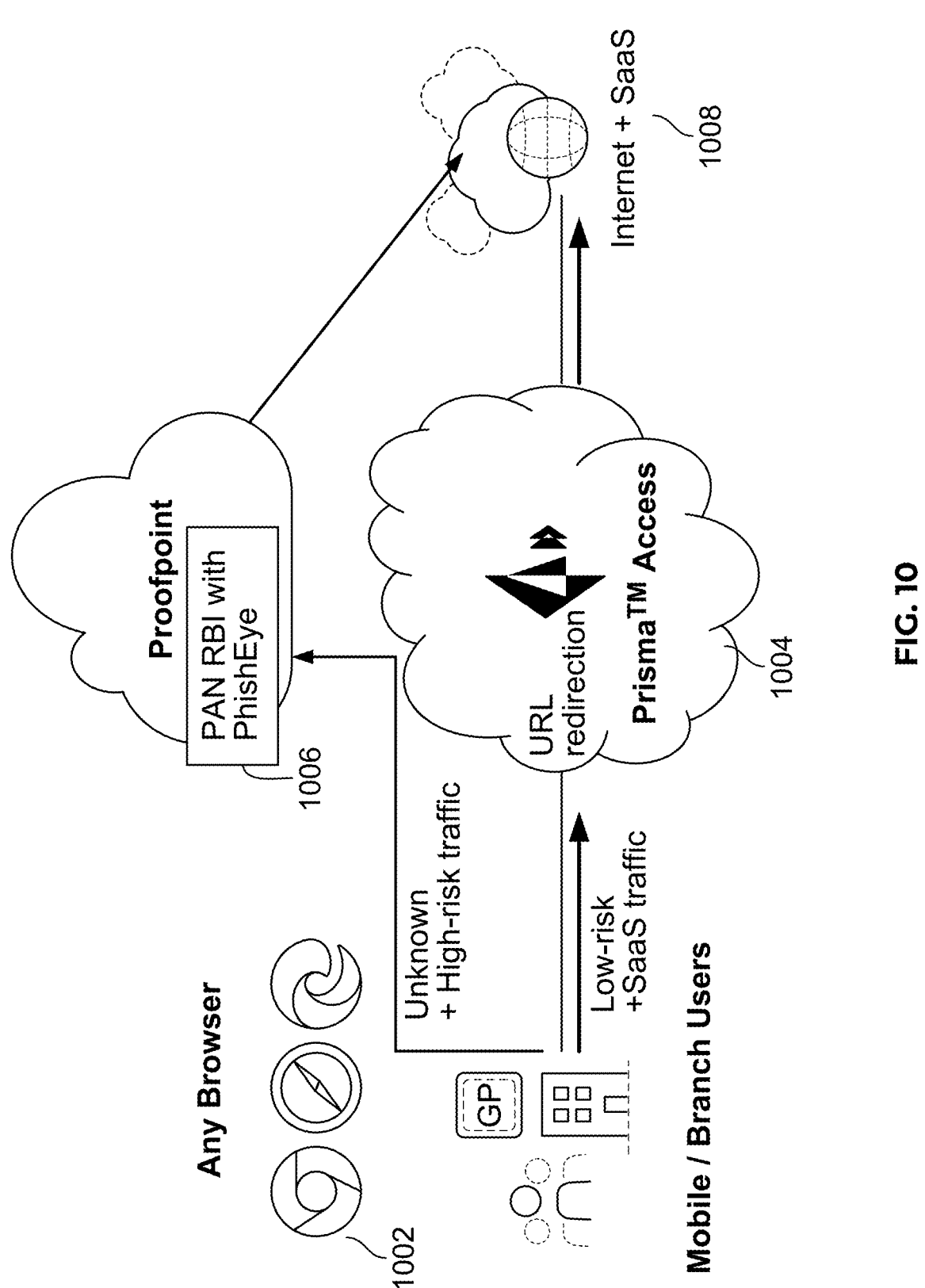
FIG. 10 illustrates an example implementation of visual deep learning for inline phishing detection using a remote browser isolation (RBI) environment in accordance with some embodiments.

FIG. 10 illustrates example implementations of visual deep learning for inline phishing detection using a remote browser isolation (RBI) environment in accordance with some embodiments. In an example implementation, the disclosed visual deep learning for phishing detection can be applied for inline phishing detection that is implemented as a browser extension, or a plugin, in a remote-browser-isolation (RBI) environment (e.g., an RBI solution that is integrated with the Prisma™ Access SASE solution that is commercially available from Palo Alto Networks, Inc., or another RBI integrated SASE solution can be similarly used).

Specifically, the RBI use case is similar to the browser use case described above with respect to FIG. 9. However, instead of having to manually install a browser extension, the user's web browsing session in the RBI use case is rendered via a remote browser, and the phishing detection tool is executed inside the remote browser to perform the above-described visual deep learning for inline phishing detection techniques.

Referring to FIG. 10, any web browser can be executed on the mobile/branch users' endpoint devices as shown at 1002. Low-risk and Software as a Service (SaaS) traffic passed through the Prisma™ Access SASE fabric 1004 to have security applied and access provided to the Internet and SaaS applications/services as shown at 1008. However, high-risk and unknown traffic is passed to an RBI solution 1006 (e.g., an RBI solution that is integrated with the Prisma™ Access SASE solution, shown as PAN RBI in FIG. 10, that is commercially available from Palo Alto Networks, Inc., or another RBI integrated SASE solution can be similarly used) with the disclosed visual deep learning for phishing detection (e.g., referred to as PhishEye as shown in FIG. 10). At 1006, the disclosed visual deep learning for phishing detection techniques can be applied as similarly described above, and non-phishing traffic can then be permitted access (e.g., or a user can review an injected potential phishing detection warning in their browser screen, and verify that it is not believed to be a phishing page) to the Internet and SaaS applications/services as shown at 1008.

Various process embodiments for visual deep learning for inline phishing detection will now be further described below.

Example Process Embodiments for Visual Deep Learning for Inline Phishing Detection FIG. 11 is a flow diagram for visual deep learning for inline phishing detection in accordance with some embodiments. In some embodiments, a process as shown in FIG. 11 is performed by a browser (e.g., using a browser extension, browser plugin, enterprise browser, or a remote browser isolation (RBI) environment, such as similarly described above with respect to FIGS. 9 and 10) or a security platform (e.g., a data appliance 102 using a malware analysis system 112, such as advanced URL filtering and/or other components), and techniques as similarly described above including the embodiments described above with respect to FIGS. 1-3 and 5-10.

At 1102, extracting a logo from a screenshot of a web page is performed, such as similarly described above with respect to FIGS. 5-7. In an example implementation, a login form is detected in the screenshot of the web page (e.g., based on detection of one or more login/credential input elements in the screenshot of the web page to facilitate classification of the web page as a login page, such as similarly described above).

At 1104, detecting phishing is performed based on a match to at least one of a plurality of reference logos using a visual deep learning model and that a domain associated with the web page is not associated with an entity that matches the logo extracted from the web page, such as similarly described above with respect to FIGS. 5-7. For example, a set of reference logos are embedded as feature vectors using the visual deep learning model and then clustered, filtered, and deduplicated to generate the plurality of reference logos, such as similarly described above with respect to FIG. 8.

At 1106, a remedial action is performed in response to determining that the web page is associated with phishing. For example, the remedial action can include injecting a warning in the web page, and wherein the detecting phishing is performed using a browser extension, browser plugin, enterprise browser, or a remote browser isolation (RBI) environment, such as similarly described above with respect to FIGS. 9 and 10.

FIG. 12 is another flow diagram for visual deep learning for inline phishing detection in accordance with some embodiments. In some embodiments, a process as shown in FIG. 12 is performed by a browser (e.g., using a browser extension, browser plugin, enterprise browser, or a remote browser isolation (RBI) environment, such as similarly described above with respect to FIGS. 9 and 10) or a security platform (e.g., a data appliance 102 using a malware analysis system 112, such as advanced URL filtering and/or other components), and techniques as similarly described above including the embodiments described above with respect to FIGS. 1-3 and 5-10. In another example implementation, the logo clustering process is performed in a cloud security service (e.g., a remote server, such as for an Advanced URL Filtering (AUF) server of a cloud security service on a periodic basis, rather than locally, in real-time on the endpoint).

At 1202, embedding a set of reference logos as feature vectors using a visual deep learning model is performed, such as similarly described above with respect to FIG. 8.

At 1204, the set of reference logo embeddings are clustered using a centroid-based clustering algorithm, such as similarly described above with respect to FIG. 8.

At 1206, the clustered set of reference logo embeddings are filtered and deduplicated to generate a plurality of reference logos to be used for performing visual deep learning for inline phishing detection, such as similarly described above with respect to FIGS. 5-10.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
   a processor configured to:
      extract a logo from a screenshot of a web page;
      detect phishing based on a match to at least one of a plurality of reference logos using a visual deep learning model and that a domain associated with the web page is not associated with an entity that matches the logo extracted from the web page, comprising to:
         input the extracted logo into the visual deep learning model to output a first feature vector and a second feature vector, wherein the visual deep learning model passes the extracted logo to at least two different sub-networks to generate the first feature vector and the second feature vector;
         input a combination of the first feature vector and the second feature vector into a neural network to generate a logo embedding;
         determine a similarity of the logo embedding associated with the logo and a reference logo embedding associated with the at least one reference logo; and
         in response to a determination that the similarity fails to equal or exceed a similarity threshold, determine that the web page is associated with phishing; and

perform a remedial action in response to determining that the web page is associated with phishing; and a memory coupled to the processor and configured to provide the processor with instructions.

2. The system of claim 1, wherein a set of candidate reference logos are embedded as feature vectors using the visual deep learning model and then clustered, filtered, and deduplicated to generate the plurality of reference logos.

3. The system of claim 1, wherein the remedial action includes injecting a warning in the web page, and wherein the detecting phishing is performed using a browser extension, browser plugin, enterprise browser, or a remote browser isolation (RBI) environment.

4. The system of claim 1, wherein the remedial action includes blocking the response.

5. The system of claim 1, wherein performing the remedial action includes adding a Uniform Resource Locator (URL) associated with a detected phishing server to a block list.

6. The system of claim 1, wherein a login form is detected in the screenshot of the web page.

7. The system of claim 1, wherein a Uniform Resource Locator (URL) is extracted from a request for the web page that was determined to be associated with phishing activity, and wherein the URL is added to a URL block list.

8. The system of claim 1, wherein an output of the visual deep learning model includes an embedding vector that is compared with a plurality of embedding vectors for the plurality of reference logos.

9. The system of claim 1, wherein the plurality of reference logos includes a plurality of embedded reference logos, and wherein a new reference logo is added as a new embedded reference logo for potentially matching with the extracted logo without retraining of the visual deep learning model.

10. The system of claim 1, wherein performing the remedial action includes providing an explanation of the phishing detection that includes a matching reference logo and information indicating that the web page is not associated with an entity that matches the logo extracted from the web page.

11. A method, comprising:

extracting a logo from a screenshot of a web page;

detecting phishing based on a match to at least one of a plurality of reference logos using a visual deep learning model and that a domain associated with the web page is not associated with an entity that matches the logo extracted from the web page, comprising:

inputting the extracted logo into the visual deep learning model to output a first feature vector and a second feature vector, wherein the visual deep learning model passes the extracted logo to at least two different sub-networks to generate the first feature vector and the second feature vector;

inputting a combination of the first feature vector and the second feature vector into a neural network to generate a logo embedding;

determining a similarity of the logo embedding associated with the logo and a reference logo embedding associated with the at least one reference logo; and in response to a determination that the similarity fails to equal or exceed a similarity threshold, determining that the web page is associated with phishing; and

performing a remedial action in response to determining that the web page is associated with phishing.

12. The method of claim 11, wherein a set of candidate reference logos are embedded as feature vectors using the visual deep learning model and then clustered, filtered, and deduplicated to generate the plurality of reference logos.

13. The method of claim 11, wherein the remedial action includes injecting a warning in the web page, and wherein the detecting phishing is performed using a browser extension, browser plugin, enterprise browser, or a remote browser isolation (RBI) environment.

14. The method of claim 11, wherein the remedial action includes blocking the response.

15. The method of claim 11, wherein performing the remedial action includes adding a Uniform Resource Locator (URL) associated with a detected phishing server to a block list.

16. The method of claim 11, wherein a Uniform Resource Locator (URL) is extracted from a request for the web page that was determined to be associated with phishing activity, and wherein the URL is added to a URL block list.

17. A computer program product embodied in a non-transitory computer readable medium and comprising computer instructions for:

extracting a logo from a screenshot of a web page;

detecting phishing based on a match to at least one of a plurality of reference logos using a visual deep learning model and that a domain associated with the web page is not associated with an entity that matches the logo extracted from the web page, comprising:

inputting the extracted logo into the visual deep learning model to output a first feature vector and a second feature vector, wherein the visual deep learning model passes the extracted logo to at least two different sub-networks to generate the first feature vector and the second feature vector;

inputting a combination of the first feature vector and the second feature vector into a neural network to generate a logo embedding;

determining a similarity of the logo embedding associated with the logo and a reference logo embedding associated with the at least one reference logo; and in response to a determination that the similarity fails to equal or exceed a similarity threshold, determining that the web page is associated with phishing; and performing a remedial action in response to determining that the web page is associated with phishing.

18. The computer program product of claim 17, wherein a set of candidate reference logos are embedded as feature vectors using the visual deep learning model and then clustered, filtered, and deduplicated to generate the plurality of reference logos.

19. The computer program product of claim 17, wherein the remedial action includes injecting a warning in the web page, and wherein the detecting phishing is performed using a browser extension, browser plugin, enterprise browser, or a remote browser isolation (RBI) environment.

20. The computer program product of claim 17, wherein the remedial action includes blocking the response.

* * * * *